(12) United States Patent
Brown et al.

(10) Patent No.: US 11,219,898 B2
(45) Date of Patent: Jan. 11, 2022

(54) MOLECULAR SEPARATION BY DIFFUSION USING AN EWOD DEVICE

(71) Applicant: Sharp Life Science (EU) Limited, Oxford (GB)

(72) Inventors: Christopher James Brown, Oxford (GB); Sally Anderson, Oxford (GB); Adam Christopher Wilson, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 195 days.

(21) Appl. No.: 16/276,985

(22) Filed: Feb. 15, 2019

(65) Prior Publication Data
US 2020/0261911 A1   Aug. 20, 2020

(51) Int. Cl.
*B01L 3/00* (2006.01)

(52) U.S. Cl.
CPC ..... *B01L 3/502761* (2013.01); *B01L 3/50273* (2013.01); *B01L 2300/0864* (2013.01);
(Continued)

(58) Field of Classification Search
CPC .......... B01L 3/502761; B01L 3/50273; B01L 2300/0864; B01L 2400/0424;
(Continued)

(56) References Cited

U.S. PATENT DOCUMENTS

| 7,163,612 B2 | 1/2007 | Sterling et al. |
| 8,173,000 B1 | 5/2012 | Hadwen et al. |

(Continued)

OTHER PUBLICATIONS

Fair, R.B., "Digital microfluids: is a true lab-on-a-chip possible?" Microfluidics and Nanofluidics Jun. 2007, vol. 3, Issue 3, pp. 245-281.

(Continued)

*Primary Examiner* — Samuel P Siefke
(74) *Attorney, Agent, or Firm* — Renner, Otto, Boisselle & Sklar, LLP

(57) ABSTRACT

A method of operating an electrowetting on dielectric (EWOD) device performs microfluidic diffusion separation. The method includes the steps of: inputting a sample droplet into the EWOD device, wherein the sample droplet includes a mixture of particles including first particles and second particles that are different from each other; inputting a collection droplet into the EWOD device; performing an electrowetting operation to bring the sample droplet into contact with the collection droplet; at an initial time, initiating a process of particle separation by which a portion of the sample droplet is introduced into the collection droplet, wherein the first particles move through the collection droplet at a rate different from the second particles; and after a time interval from the initial time, performing an electrowetting operation to segment a leaving droplet from the collection droplet, wherein the leaving droplet has a higher concentration of the first particles relative to the second particles as compared to a concentration of the first particles relative to the second particles in the sample droplet at the initial time. The method may be performed by an AM-EWOD control system executing program code stored on a non-transitory computer readable medium.

20 Claims, 14 Drawing Sheets

(52) U.S. Cl.
CPC ............... *B01L 2400/0424* (2013.01); *B01L 2400/0427* (2013.01)

(58) Field of Classification Search
CPC ....... B01L 2400/0427; B01L 3/502753; B01L 2300/0816; B01L 2300/087; B01L 2400/0421; B01L 3/502784; G01N 27/447; G01N 27/44773; G01N 27/44791
See application file for complete search history.

(56) References Cited

U.S. PATENT DOCUMENTS

| | | | |
|---|---|---|---|
| 8,653,832 | B2 | 2/2014 | Hadwen et al. |
| 9,952,222 | B2 | 4/2018 | Yates et al. |
| 2008/0053205 | A1 | 3/2008 | Pollack et al. |
| 2016/0310947 | A1* | 10/2016 | Walsh ...................... G01N 1/38 |
| 2017/0056887 | A1 | 3/2017 | Hadwen et al. |
| 2017/0076676 | A1 | 3/2017 | Hadwen |
| 2018/0078934 | A1 | 3/2018 | Hadwen et al. |

OTHER PUBLICATIONS

Weigl & Yager, "Microfluidic Diffusion-Based Separation and Detection", Science, Jan. 15, 1999: vol. 283, Issue 5400, pp. 346-347, DOI: 10.1126/science.283.5400.346 (summary only).

* cited by examiner

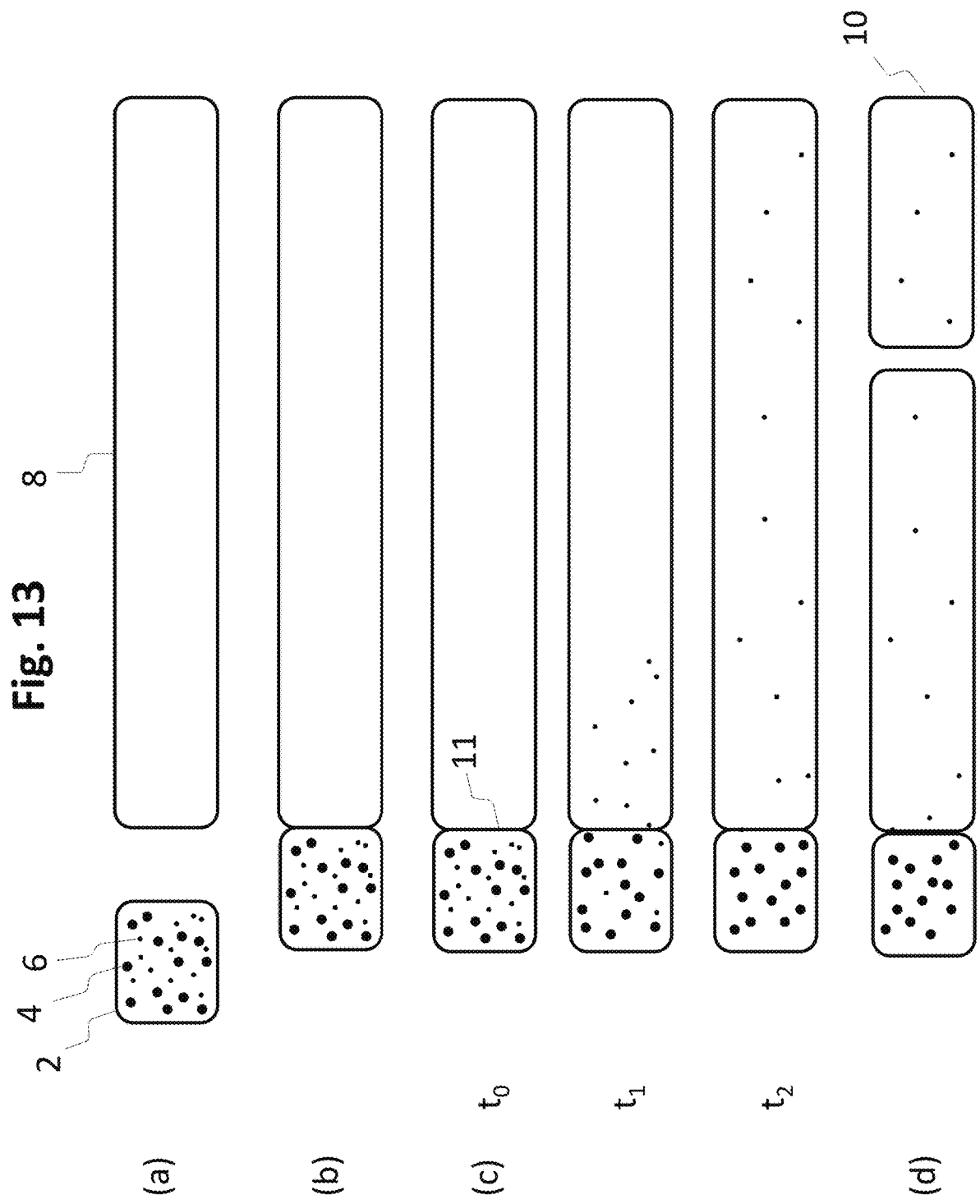

MOLECULAR SEPARATION BY DIFFUSION USING AN EWOD DEVICE

TECHNICAL FIELD

The present invention relates to droplet microfluidic devices, and more specifically to Active Matrix Electrowetting-On-Dielectric (AM-EWOD) devices, and to methods of processing and separation of samples for use in proteomic and genomic analysis using EWOD devices.

BACKGROUND ART

Electrowetting on dielectric (EWOD) is a well-known technique for manipulating droplets of fluid by application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 is a drawing depicting an exemplary EWOD based microfluidic system. In the example of FIG. 1, the microfluidic system includes a reader 32 and a cartridge 34. The cartridge 34 may contain a microfluidic device, such as an AM-EWOD device 36, as well as (not shown) fluid input ports into the device and an electrical connection as are conventional. The fluid input ports may perform the function of inputting fluid into the AM-EWOD device 36 and generating droplets within the device, for example by dispensing from input reservoirs as controlled by electrowetting. As further detailed below, the microfluidic device includes an electrode array configured to receive the inputted fluid droplets.

The microfluidic system further may include a control system configured to control actuation voltages applied to the electrode array of the microfluidic device to perform manipulation operations to the fluid droplets. For example, the reader 32 may contain such a control system configured as control electronics 38 and a storage device 40 that may store any application software and any data associated with the system. The control electronics 38 may include suitable circuitry and/or processing devices that are configured to carry out various control operations relating to control of the AM-EWOD device 36, such as a CPU, microcontroller or microprocessor.

In the example of FIG. 1, an external sensor module 35 is provided for sensor droplet properties. For example, optical sensors as are known in the art may be employed as external sensors for sensing droplet properties, which may be incorporated into a probe that can be located in proximity to the EWOD device. Suitable optical sensors include camera devices, light sensors, charged coupled devices (CCD) and similar image sensors, and the like. A sensor additionally or alternatively may be configured as internal sensor circuitry incorporated as part of the drive circuitry in each array element. Such sensor circuitry may sense droplet properties by the detection of an electrical property at the array element, such as impedance or capacitance.

FIG. 2 is a drawing depicting additional details of the exemplary AM-EWOD device 36 in a perspective view. The AM-EWOD device 36 has a lower substrate assembly 44 with thin film electronics 46 disposed upon the lower substrate assembly 44. The thin film electronics 46 are arranged to drive array element electrodes 48. A plurality of array element electrodes 48 are arranged in an electrode or element two-dimensional array 50, having N rows by M columns of array elements where N and M may be any integer. A liquid droplet 52 which may include any polar liquid and which typically may be aqueous, is enclosed between the lower substrate 44 and a top substrate 54 separated by a spacer 56, although it will be appreciated that multiple liquid droplets 52 can be present.

FIG. 3 is a drawing depicting a cross section through some of the array elements of the exemplary AM-EWOD 36 device of FIG. 2. In the portion of the AM-EWOD device depicted in FIG. 3, the device includes a pair of the array element electrodes 48A and 48B that are shown in cross section that may be utilized in the electrode or element array 50 of the AM-EWOD device 36 of FIG. 3. The AM-EWOD device 36 further incorporates the thin-film electronics 46 disposed on the lower substrate 44, which is separated from the upper substrate 54 by the spacer 56. The uppermost layer of the lower substrate 44 (which may be considered a part of the thin film electronics layer 46) is patterned so that a plurality of the array element electrodes 48 (e.g. specific examples of array element electrodes are 48A and 48B in FIG. 3) are realized. The term element electrode 48 may be taken in what follows to refer both to the physical electrode structure 48 associated with a particular array element, and also to the node of an electrical circuit directly connected to this physical structure. A reference electrode 58 is shown in FIG. 3 disposed upon the top substrate 54, but the reference electrode alternatively may be disposed upon the lower substrate 44 to realize an in-plane reference electrode geometry. The term reference electrode 58 may also be taken in what follows to refer to both or either of the physical electrode structure and also to the node of an electrical circuit directly connected to this physical structure.

In the AM-EWOD device 36, a non-polar fluid 60 (e.g. oil) may be used to occupy the volume not occupied by the liquid droplet 52. An insulator layer 62 may be disposed upon the lower substrate 44 that separates the conductive element electrodes 48A and 48B from a first hydrophobic coating 64 upon which the liquid droplet 52 sits with a contact angle 66 represented by θ. The hydrophobic coating is formed from a hydrophobic material (commonly, but not necessarily, a fluoropolymer). On the top substrate 54 is a second hydrophobic coating 68 with which the liquid droplet 52 may come into contact. The reference electrode 58 is interposed between the top substrate 54 and the second hydrophobic coating 68.

The contact angle θ for the liquid droplet is defined as shown in FIG. 3, and is determined by the balancing of the surface tension components between the solid-liquid ($\gamma_{SL}$), liquid-gas ($\gamma_{LG}$) and non-ionic fluid ($\gamma_{SG}$) interfaces, and in the case where no voltages are applied satisfies Young's law, the equation being given by:

$$\cos \theta = \frac{\gamma_{SG} - \gamma_{SL}}{\gamma_{LG}} \quad \text{(equation 1)}$$

In operation, voltages termed the EW drive voltages, (e.g. $V_T$, $V_0$ and $V_{00}$ in FIG. 3) may be externally applied to different electrodes (e.g. reference electrode 58, element electrodes 48A and 48B, respectively). The resulting electrical forces that are set up effectively control the hydrophobicity of the hydrophobic coating 64. By arranging for different EW drive voltages (e.g. $V_0$ and $V_{00}$) to be applied to different element electrodes (e.g. 48A and 48B), the liquid droplet 52 may be moved in the lateral plane between the two substrates, from one electrode (48A) to the other (48B).

FIG. 4A shows a circuit representation of the electrical load 70A between the element electrode 48 and the reference electrode 58 in the case when a liquid droplet 52 is present. The liquid droplet 52 can usually be modeled as a resistor and capacitor in parallel. Typically, the resistance of the droplet will be relatively low (e.g. if the droplet contains ions) and the capacitance of the droplet will be relatively high (e.g. because the relative permittivity of polar liquids is relatively high, e.g. ~80 if the liquid droplet is aqueous). In many situations the droplet resistance is relatively small, such that at the frequencies of interest for electrowetting, the liquid droplet 52 may function effectively as an electrical short circuit. The hydrophobic coatings 64 and 68 have electrical characteristics that may be modelled as capacitors, and the insulator 62 may also be modelled as a capacitor. The overall impedance between the element electrode 48 and the reference electrode 58 may be approximated by a capacitor whose value is typically dominated by the contribution of the insulator 62 and hydrophobic coatings 64 and 68 contributions, and which for typical layer thicknesses and materials may be on the order of a pico-Farad in value.

FIG. 4B shows a circuit representation of the electrical load 70B between the element electrode 48 and the reference electrode 58 in the case when no liquid droplet is present. In this case the liquid droplet components are replaced by a capacitor representing the capacitance of the non-polar fluid 60 which occupies the space between the top and lower substrates. In this case the overall impedance between the element electrode 48 and the reference electrode 58 may be approximated by a capacitor whose value is dominated by the capacitance of the non-polar fluid and which is typically small, on the order of femto-Farads.

For the purposes of driving and sensing the array elements, the electrical load 70A/70B overall functions in effect as a capacitor, whose value depends on whether a liquid droplet 52 is present or not at a given element electrode 48. In the case where a droplet is present, the capacitance is relatively high (typically of order pico-Farads), whereas if there is no liquid droplet present the capacitance is low (typically of order femto-Farads). If a droplet partially covers a given electrode 48 then the capacitance may approximately represent the extent of coverage of the element electrode 48 by the liquid droplet 52.

U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in active matrix display technologies. The approach of U.S. Pat. No. 7,163,612 may be termed "Active Matrix Electrowetting on Dielectric" (AM-EWOD). There are several advantages in using TFT based thin film electronics to control an EWOD array, namely:

Electronic driver circuits can be integrated onto the lower substrate.

TFT-based thin film electronics are well suited to the AM-EWOD application. They are cheap to produce so that relatively large substrate areas can be produced at relatively low cost.

TFTs fabricated in standard processes can be designed to operate at much higher voltages than transistors fabricated in standard CMOS processes. This is significant since many EWOD technologies require electrowetting voltages in excess of 20V to be applied.

FIG. 5 is a drawing depicting an exemplary arrangement of thin film electronics 46 in the exemplary AM-EWOD device 36 of FIG. 2. The thin film electronics 46 is located upon the lower substrate 44. Each array element 51 of the array of elements 50 contains an array element circuit 72 for controlling the electrode potential of a corresponding element electrode 48. Integrated row driver 74 and column driver 76 circuits are also implemented in thin film electronics 46 to supply control signals to the array element circuit 72. The array element circuit 72 may also contain a sensor capability for detecting the presence or absence of a liquid droplet in the location of the array element. Integrated sensor row addressing 78 and column detection circuits 80 may further be implemented in thin film electronics for the addressing and readout of the sensor circuitry in each array element.

A serial interface 82 may also be provided to process a serial input data stream and facilitate the programming of the required voltages to the element electrodes 48 in the array 50. A voltage supply interface 84 provides the corresponding supply voltages, top substrate drive voltages, and other requisite voltage inputs as further described herein. A number of connecting wires 86 between the lower substrate 44 and external control electronics, power supplies and any other components can be made relatively few, even for large array sizes. Optionally, the serial data input may be partially parallelized. For example, if two data input lines are used the first may supply data for columns 1 to X/2, and the second for columns (1+X/2) to M with minor modifications to the column driver circuits 76. In this way the rate at which data can be programmed to the array is increased, which is a standard technique used in liquid crystal display driving circuitry.

FIG. 6 is a drawing depicting an exemplary arrangement of the array element circuit 72 present in each array element 51, which may be used as part of the thin film electronics of FIG. 5. The array element circuit 72 may contain an actuation circuit 88, having inputs ENABLE, DATA and ACTUATE, and an output which is connected to an element electrode 48. The array element circuit 72 also may contain a droplet sensing circuit 90, which may be in electrical communication with the element electrode 48. Typically, the read-out of the droplet sensing circuit 90 may be controlled by one or more addressing lines (e.g. RW) that may be common to elements in the same row of the array, and may also have one or more outputs, e.g. OUT, which may be common to all elements in the same column of the array.

The array element circuit 72 may typically perform the functions of:

(i) Selectively actuating the element electrode 48 by supplying a voltage to the array element electrode. Accordingly, any liquid droplet present at the array element 51 may be actuated or de-actuated by the electro-wetting effect.

(ii) Sensing the presence or absence of a liquid droplet at the location of the array element 51. The means of sensing may be capacitive or impedance, optical, thermal or some other means. Capacitive or impedance sensing may be employed conveniently and effectively using an integrated impedance sensor circuit as part of the array element circuitry.

Various methods of controlling an AM-EWOD device to sense droplets and perform desired droplet manipulations have been described. For example, US 2017/0056887 (Hadwen et al., published Mar. 2, 2017) describes the use of capacitance detection to sense dynamic properties of reagents as a way for determining the output of an assay.

Such disclosure incorporates an integrated impedance sensor circuit that is incorporated specifically into the array element circuitry of each array element. Accordingly, attempts have been made to optimize integrated impedance sensing circuitry 90 of FIG. 6 into the array element structure, and in particular as part of the array element circuitry 72. Examples of AM-EWOD devices having integrated actuation and sensing circuits are described, for example, in Applicant's commonly assigned patent documents as follows: U.S. Pat. No. 8,653,832 (Hadwen et al., issued Feb. 18, 2014); US 2018/0078934 (Hadwen et al., published Mar. 22, 2018); US 2017/0076676 (Hadwen, published Mar. 16, 2017); and U.S. Pat. No. 8,173,000 (Hadwen et al., issued May 8, 2012). The enhanced method of operation described in the current application may be employed in connection with any suitable array element circuitry 72 including any suitable integrated impedance sensing circuitry 90.

In the field of chemical/biochemical reactions, microfluidic diffusion is a well-known technique for the separation of biological particles according to their hydrodynamic radius (Weigl & Yager, Science, 1999). Conventional implementations of microfluidic diffusion separation employ laminar flow in microchannels, whereby different layers of miscible fluids and particles can flow next to each other in a microchannel without any mixing other than by diffusion. Small particles diffuse faster than larger ones, which allows separation of particles by size. U.S. Pat. No. 9,952,222 (Yates et al, issued Apr. 24, 2018) describes a microfluidic device in which particles are firstly separated by microfluidic diffusion sizing and then collected for analysis. Applications of microfluidic diffusion separation include the analysis of biological molecules such as DNA and proteins.

Traditional microfluidic devices that are used to perform separation by diffusion generally rely on providing a continuously flowing stream of two liquids that remain separate along the length of the channel in which they flow. One fluid contains the material of interest and the other fluid generally is a buffer. At any given point along the length of the channel, the fluids may be considered "static" relative one to one another, and diffusion occurs across the liquid-liquid interface between the fluids. As such, there is a requirement for sufficient volume of sample to sustain continuous flow through the microchannel until a sufficient amount of target particles has been acquired by diffusion across the liquid-liquid interface.

SUMMARY OF INVENTION

The use of an EWOD or AM-EWOD device to perform microfluidic diffusion separation has not been effectively developed, as conventional microfluidic systems that perform microfluidic diffusion separation employ continuous fluid flow channels as described above. As compared to AM-EWOD devices, conventional microfluidic diffusion separation systems are bulky and require large amounts of sample and buffer fluids to accomplish adequate diffusion separation.

The present invention pertains to systems and methods of operating an EWOD or AM-EWOD device to perform a droplet-based method for microfluidic diffusion sizing and separation. In exemplary embodiments, methods of operating an EWOD/AM-EWOD device include the steps of: (a) using an EWOD device to form a sample containing droplet and a collection droplet of a pre-determined shape and volume; (b) controlling the sample and collection droplets by electrowetting forces generated by the EWOD device to cause the sample and collection droplets to come into contact and merge or form a droplet interface bilayer (DIB); (c) holding the merged/DIB droplets by electrowetting forces generated by the EWOD device to enable particles to diffuse from the sample droplet into the collection droplet; and (d) separating segmented droplets from the collection droplet after a diffusion period has elapsed by splitting sub-fraction droplets from the collection droplet.

The collection droplet may be further separated into multiple droplets to fractionate the diffused particles. Additionally, diffusion may be enhanced by providing a thermal, electrical, or other gradient between the sample and collection droplets. The resulting droplets containing separated particles may be further processed and analyzed on or off the EWOD device. Using electrowetting processes of an EWOD device to perform microfluidic diffusion separation provides a more efficient process that uses less buffer and sample materials as compared to conventional configurations that employ laminar fluid flow channels.

An aspect of the invention, therefore, is a method of operating an electrowetting on dielectric (EWOD) device to perform a method of microfluidic diffusion separation. In exemplary embodiments, the method includes the steps of: inputting a sample droplet into the EWOD device, wherein the sample droplet includes a mixture of particles including first particles and second particles that are different from each other; inputting a collection droplet into the EWOD device; performing an electrowetting operation to bring the sample droplet into contact with the collection droplet; at an initial time, initiating a process of particle separation by which a portion of the sample droplet is introduced into the collection droplet, wherein the first particles move through the collection droplet at a rate different from the second particles; and after a time interval from the initial time, performing an electrowetting operation to segment a leaving droplet from the collection droplet, wherein the leaving droplet has a higher concentration of the first particles relative to the second particles as compared to a concentration of the first particles relative to the second particles in the sample droplet at the initial time. The method may be performed by an AM-EWOD control system executing program code stored on a non-transitory computer readable medium.

Performing an electrowetting operation to bring the sample droplet into contact with the collection droplet may include merging the sample droplet and the collection droplet, and the separation process includes diffusion of the sample droplet into the collection droplet. Such merging may be performed in a manner that minimizes bulk disturbance and convective mixing of the sample droplet and the collection droplet. Performing an electrowetting operation to bring the sample droplet into contact with the collection droplet alternatively may include forming a droplet interface bilayer (DIB) at an interface of the sample droplet and the collection droplet, and the separation process includes selective movement of either the first particles or the second particles across the DIB. The separation process may include applying a gradient, such as a voltage gradient, within the collection droplet or between the sample droplet and the collection droplet to enhance the particle separation.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF DRAWINGS

FIG. 13 is a drawing depicting another exemplary method of microfluidic diffusion separation in accordance with embodiments of the present invention, illustrated as a sequence of steps (a) through (d) and employing a droplet interface bilayer.

DESCRIPTION OF EMBODIMENTS

Figure 1:
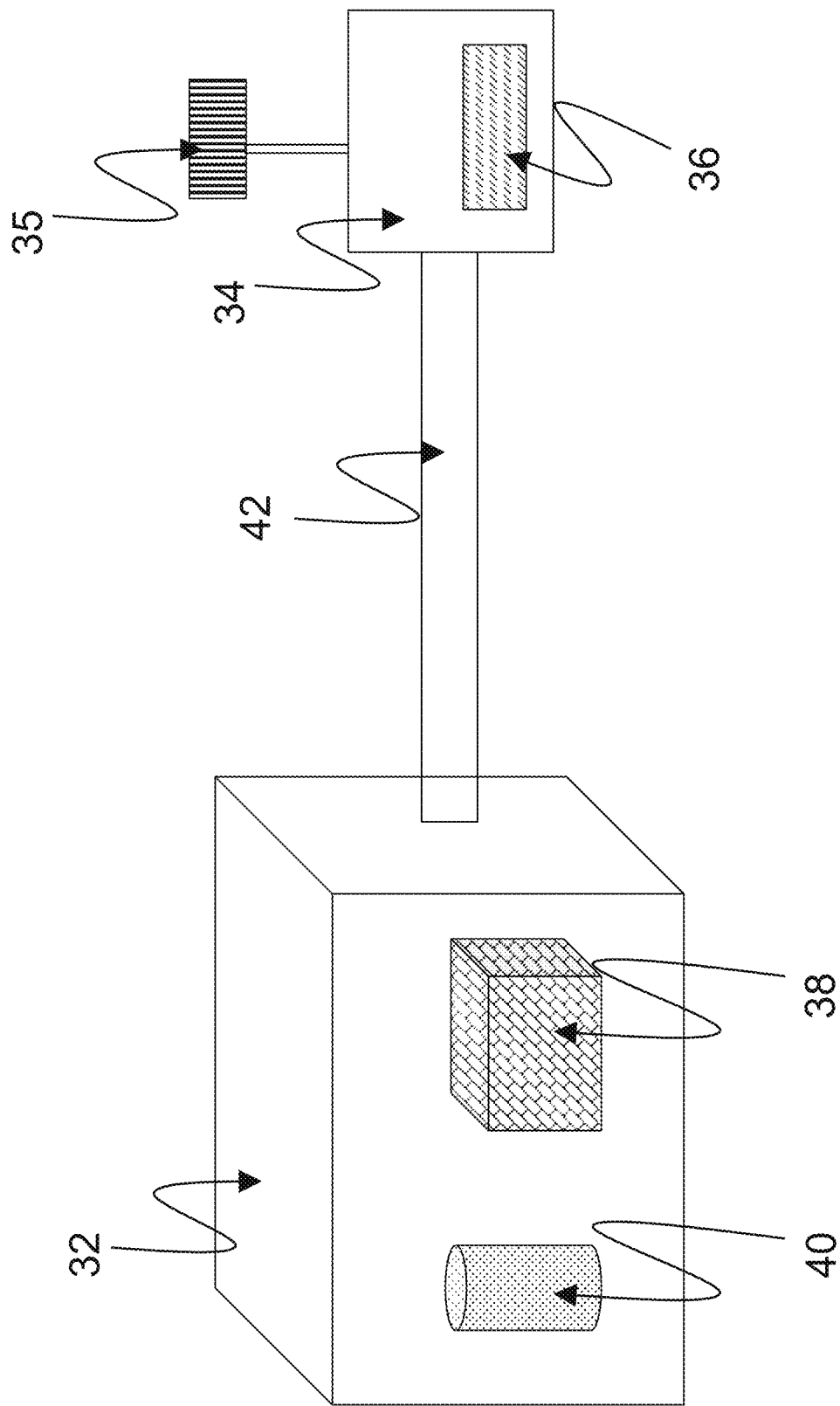
FIG. 1 is a drawing depicting an exemplary EWOD based microfluidic system.
Figure 2:
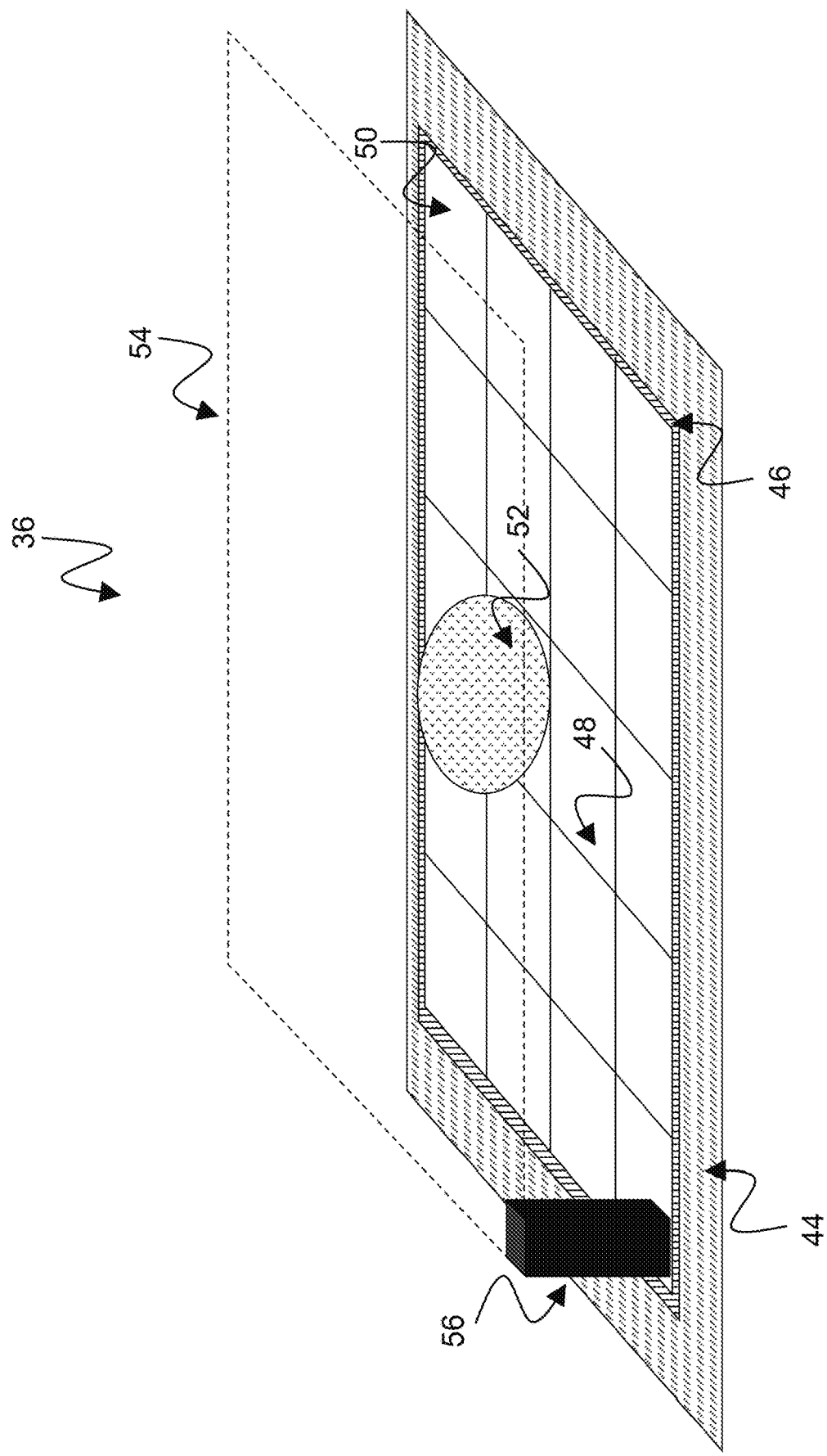
FIG. 2 is a drawing depicting an exemplary AM-EWOD device in a perspective view.
Figure 3:
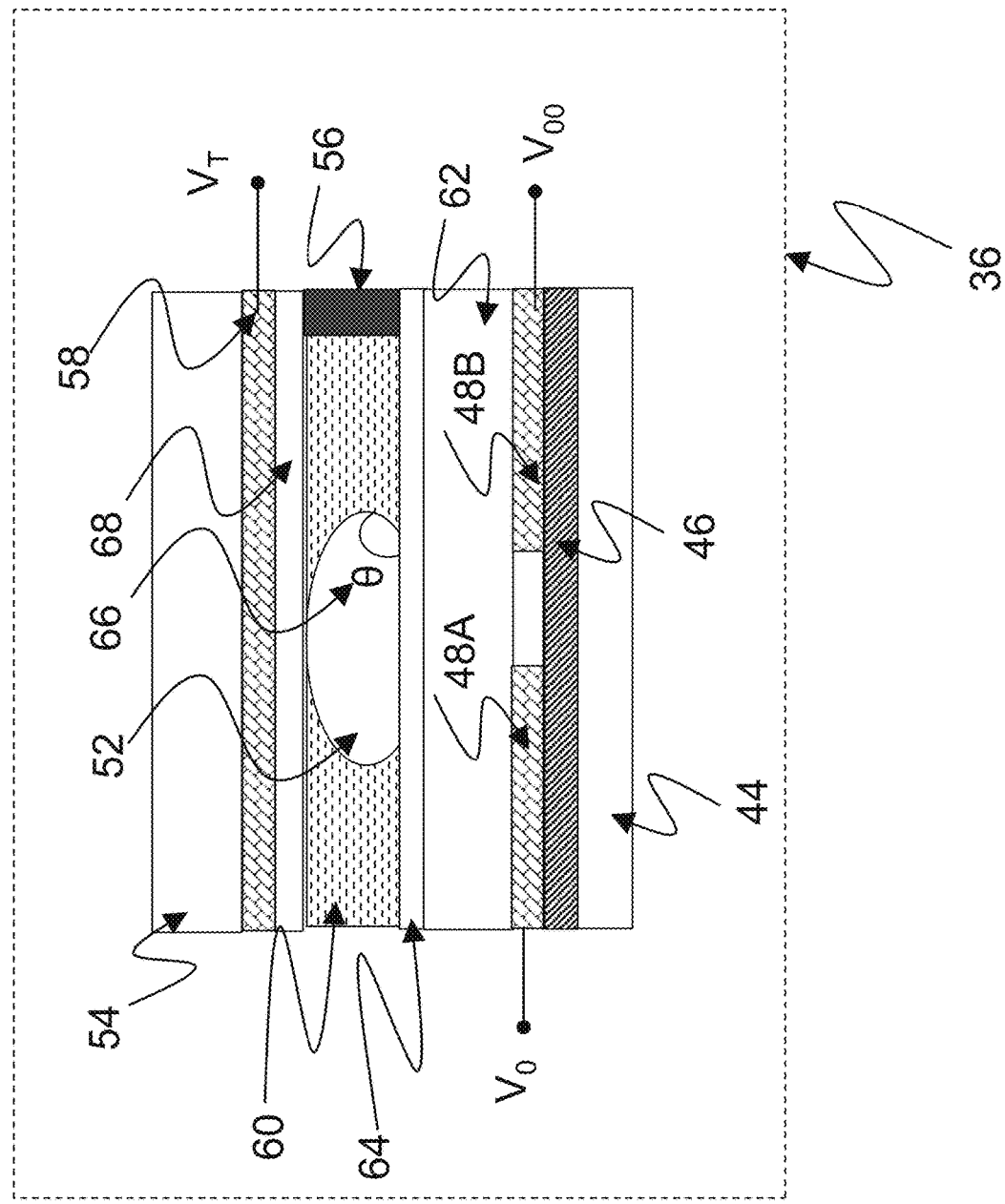
FIG. 3 is a drawing depicting a cross section through some of the array elements of the exemplary AM-EWOD device of FIG. 2.
Figure 4B:
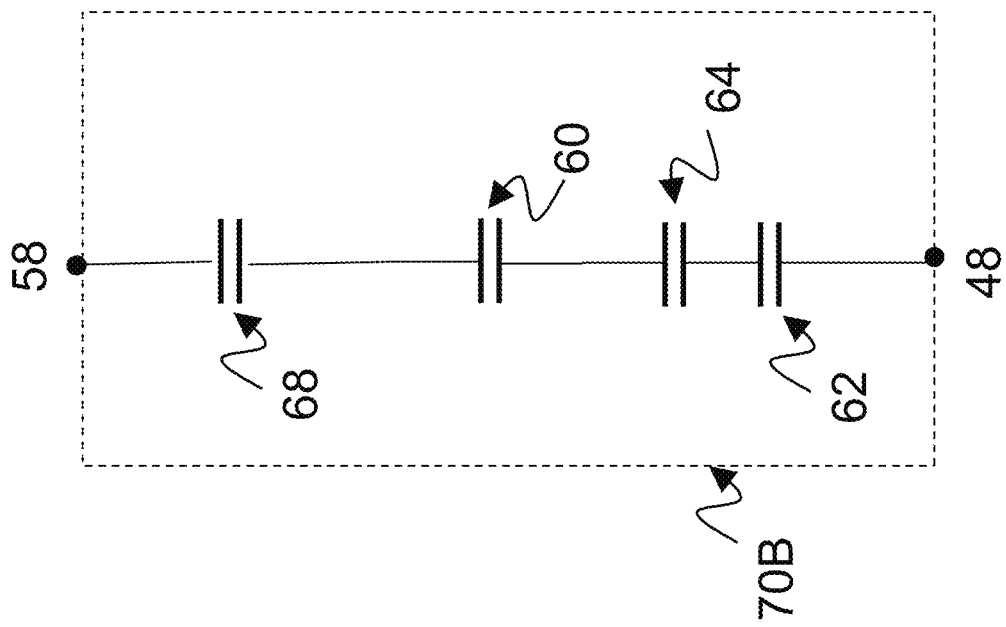
FIG. 4B is a drawing depicting a circuit representation of the electrical load presented at the element electrode when no liquid droplet is present.
Figure 4A:
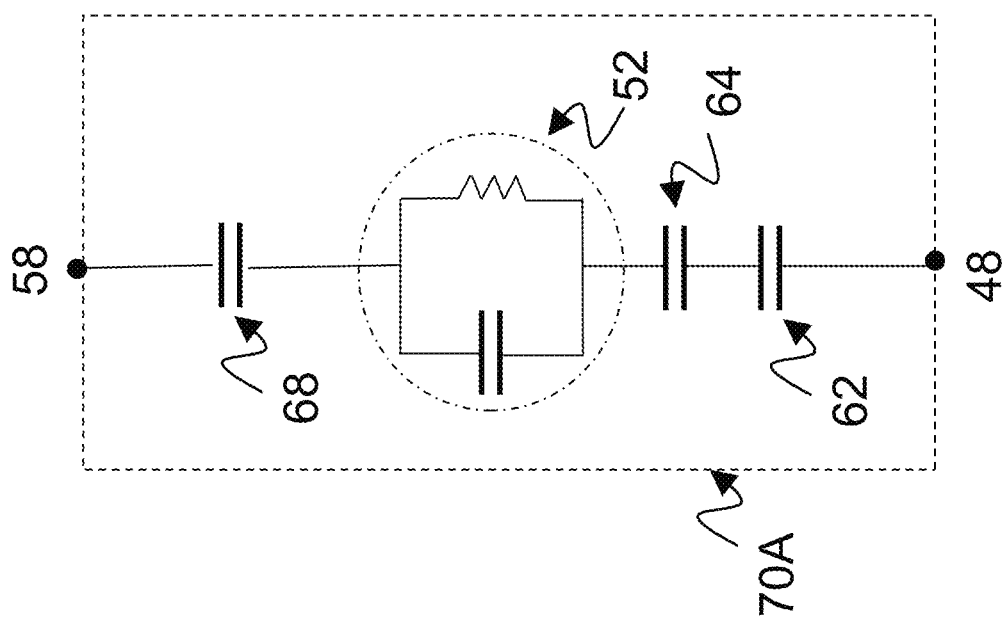
FIG. 4A is a drawing depicting a circuit representation of the electrical load presented at the element electrode when a liquid droplet is present.
Figure 5:
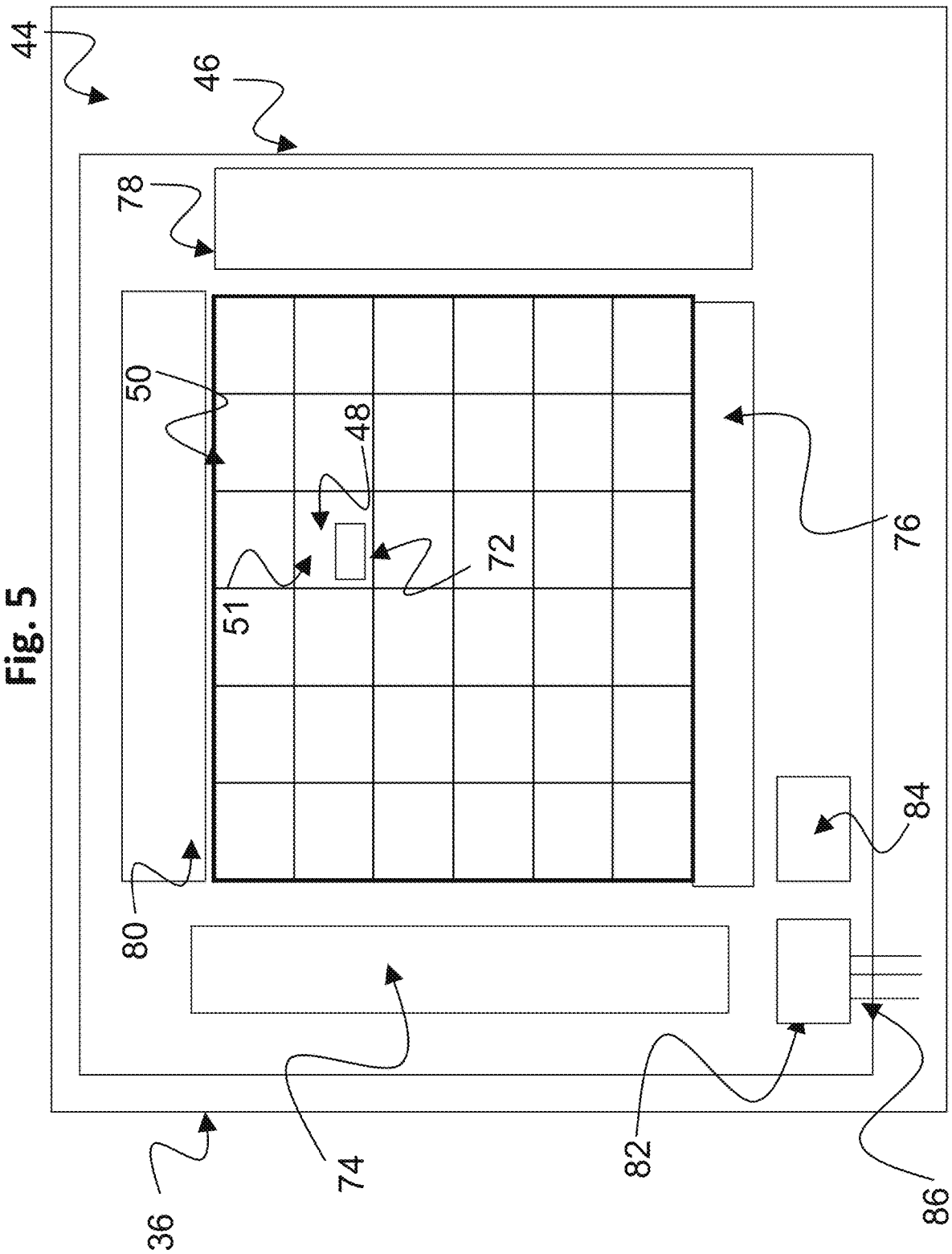
FIG. 5 is a drawing depicting an exemplary arrangement of thin film electronics in the exemplary AM-EWOD device of FIG. 2.
Figure 6:
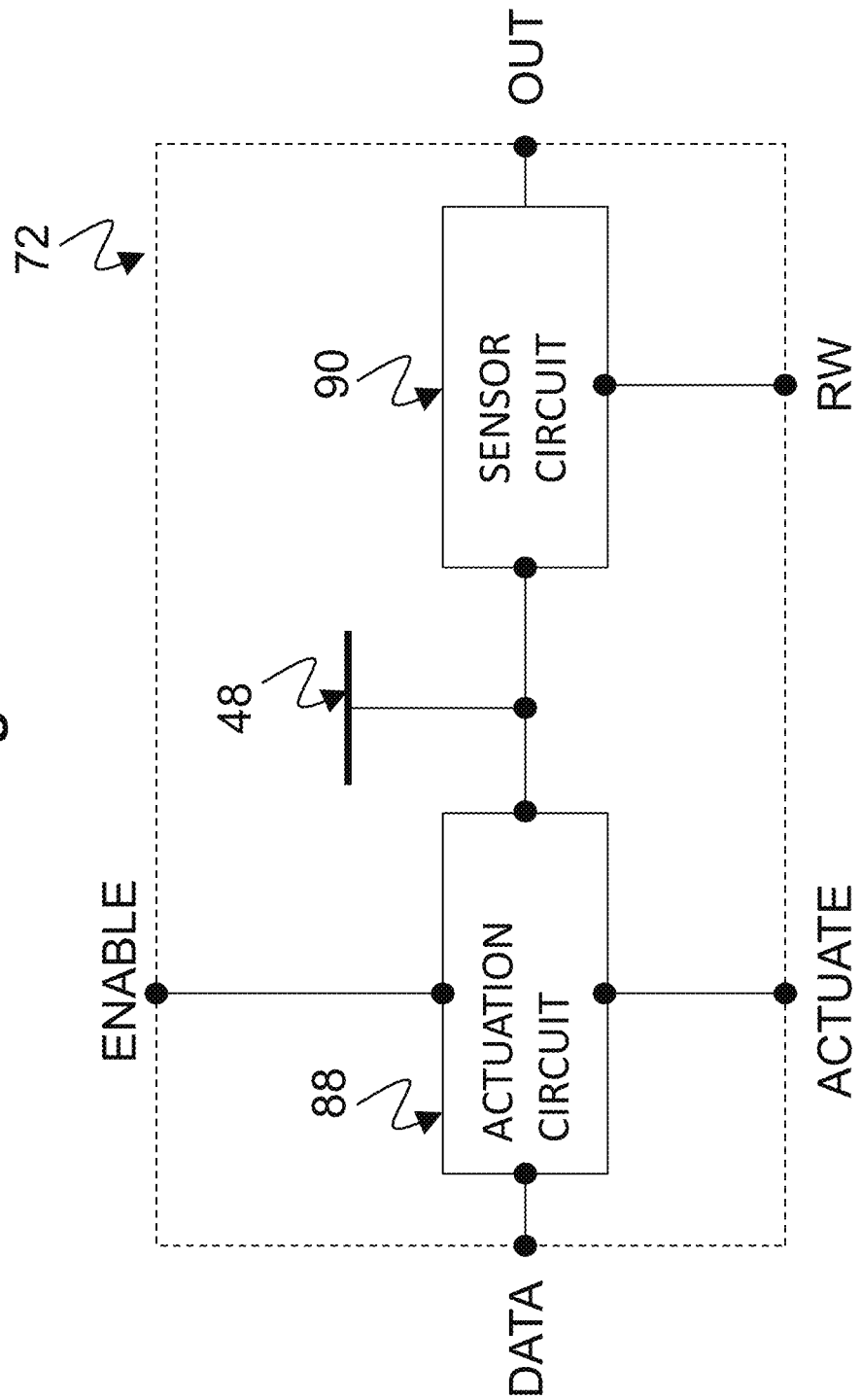
FIG. 6 is a drawing depicting exemplary array element circuitry for an AM-EWOD device.

Embodiments of the present invention will now be described with reference to the drawings, wherein like reference numerals are used to refer to like elements throughout. It will be understood that the figures are not necessarily to scale.

The present invention pertains to systems and methods of operating an EWOD or AM-EWOD device to perform a droplet-based method for microfluidic diffusion sizing and separation. In exemplary embodiments, methods of operating an EWOD/AM-EWOD device include the steps of: (a) using an EWOD device to form a sample containing droplet and a collection droplet of a pre-determined shape and volume; (b) controlling the sample and collection droplets by electrowetting forces generated by the EWOD device to cause the sample and collection droplets to come into contact and merge or form a droplet interface bilayer (DIB); (c) holding the merged/DIB droplets by electrowetting forces generated by the EWOD device to enable particles to diffuse from the sample droplet into the collection droplet; and (d) separating segmented droplets from the collection droplet after a diffusion period has elapsed by splitting sub-fraction droplets from the collection droplet. The collection droplet may be further separated into multiple droplets to fractionate the diffused particles. Additionally, diffusion may be enhanced by providing a thermal, electrical, or other gradient between the sample and collection droplets. The resulting droplets containing separated particles may be further processed and analyzed on or off the AM-EWOD device.

Referring back to FIG. 1 illustrating the overall microfluidic system, among their functions, to implement the features of the present invention, the control electronics 38 may comprise a part of the overall control system that may execute program code embodied as a control application stored within the storage device 40. It will be apparent to a person having ordinary skill in the art of computer programming, and specifically in application programming for electronic control devices, how to program the control system to operate and carry out logical functions associated with the stored control application. Accordingly, details as to specific programming code have been left out for the sake of brevity. The storage device 40 may be configured as a non-transitory computer readable medium, such as random access memory (RAM), a read-only memory (ROM), an erasable programmable read-only memory (EPROM or Flash memory), or any other suitable medium. Also, while the code may be executed by control electronics 38 in accordance with an exemplary embodiment, such control system functionality could also be carried out via dedicated hardware, firmware, software, or combinations thereof, without departing from the scope of the invention.

The control system may be configured to perform some or all of the following functions:

Define the appropriate timing signals to manipulate liquid droplets on the AM-EWOD device 36.

Interpret input data representative of sensor information measured by a sensor or sensor circuitry associated with the AM-EWOD device 36, including computing the locations, sizes, centroids, perimeters, and particle constituents of liquid droplets on the AM-EWOD device 36.

Use calculated sensor data to define the appropriate timing signals to manipulate liquid droplets on the AM-EWOD device 36, i.e. acting in a feedback mode.

Provide for implementation of a graphical user interface (GUI) whereby the user may program commands such as droplet operations (e.g. move a droplet), assay operations (e.g. perform an assay), and the GUI may report the results of such operations to the user.

The control system, such as via the control electronics 38, may supply and control the actuation voltages applied to the electrode array of the microfluidics device 36, such as required voltage and timing signals to perform droplet manipulation operations and sense liquid droplets on the AM-EWOD device 36. The control electronics further may execute the application software to generate and output control voltages for droplet sensing and performing sensing operations.

The various methods described herein pertaining to enhanced microfluidic diffusion separation may be performed using structures and devices described with respect to FIGS. 1-6, including for example any control electronics and circuitry, sensing capabilities, and control systems including any processing device that executes computer application code stored on a non-transitory computer readable medium. The following figures illustrate various methods of microfluidic diffusion separation, which in particular may be performed by the AM-EWOD device control system executing program code stored on a non-transitory computer readable medium.

An aspect of the invention, therefore, is a method of operating an electrowetting on dielectric (EWOD) device to perform a method of microfluidic diffusion separation. In exemplary embodiments, the method includes the steps of: inputting a sample droplet into the EWOD device, wherein the sample droplet includes a mixture of particles including first particles and second particles that are different from each other; inputting a collection droplet into the EWOD device; performing an electrowetting operation to bring the sample droplet into contact with the collection droplet; at an initial time, initiating a process of particle separation by which a portion of the sample droplet is introduced into the collection droplet, wherein the first particles move through the collection droplet at a rate different from the second particles; and after a time interval from the initial time, performing an electrowetting operation to segment a leaving droplet from the collection droplet, wherein the leaving droplet has a higher concentration of the first particles relative to the second particles as compared to a concentration of the first particles relative to the second particles in the sample droplet at the initial time. The method may be performed by an AM-EWOD control system executing program code stored on a non-transitory computer readable medium.

As an exemplary implementation of the principles of the present invention, the preparation of samples for proteomic or genomic analysis may typically involve initial mixing of a sample of interest with one or more reagents that digest or partially digest the sample into elements, fragments or particles. Such particles may be subjected to further downstream analyses, such as for example mass spectrometry, polyacrylamide gel electrophoresis, agarose gel electrophoresis, polymerase chain reaction, isothermal nucleic acid amplification, next generation sequencing, or other chemical or biochemical analyses. Separation of the fragmented sample into discrete compartments prior to downstream analysis generally yields improved analytical results. The present invention provides a sample handling and preparation device based on active matrix-electrowetting on dielectric (AM-EWOD) technology to perform such sample preparation.

Figure 7:
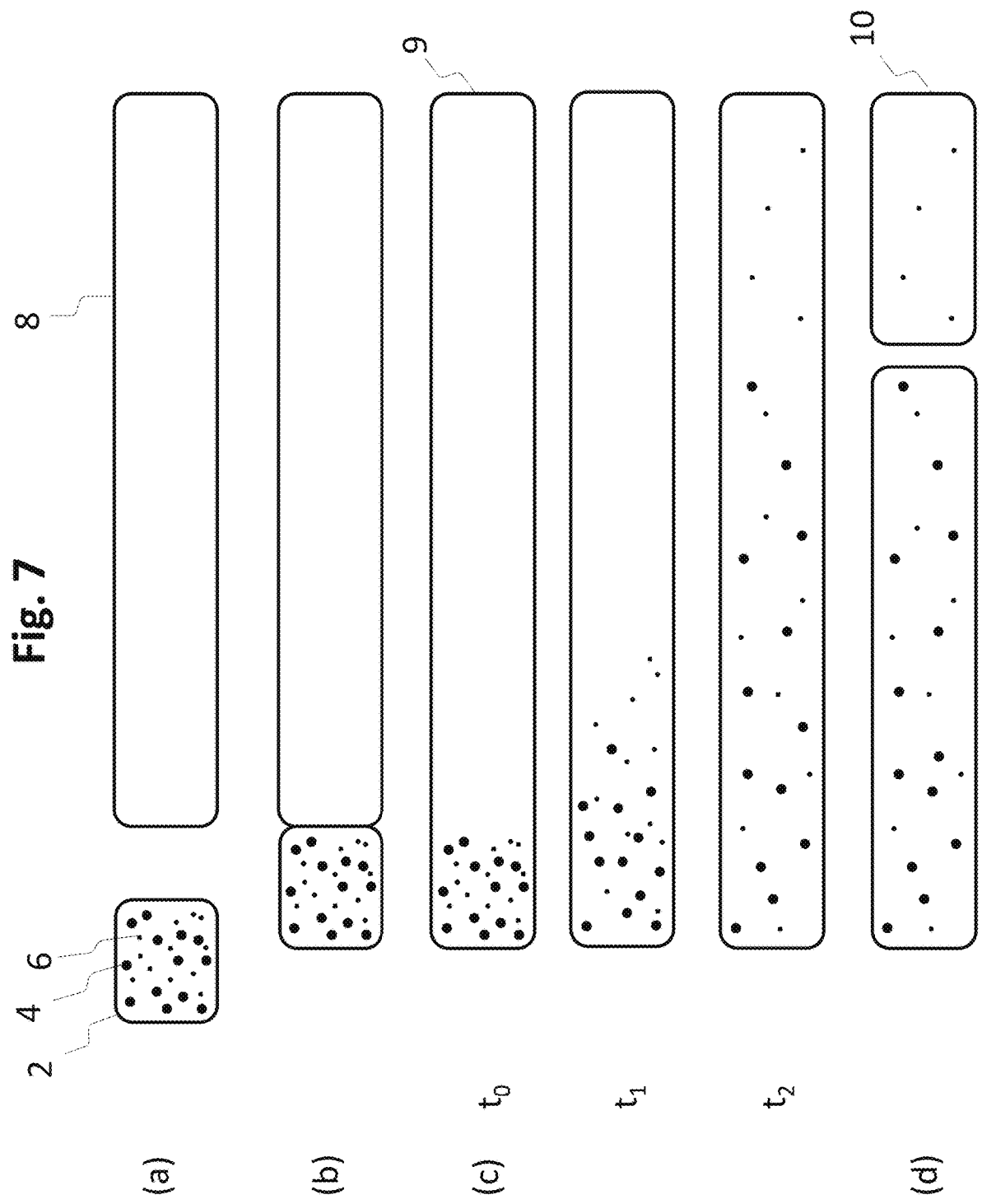
FIG. 7 is a drawing depicting an exemplary method of microfluidic diffusion separation in accordance with embodiments of the present invention, illustrated as a sequence of steps (a) through (d).

In exemplary embodiments, an AM-EWOD device, which may typically have an array of about 40,000 independently addressable elements, is used to prepare a sample for downstream analysis. FIG. 7 is a drawing depicting an exemplary method of microfluidic diffusion separation in accordance with embodiments of the present invention, illustrated as a sequence of steps (a) through (d). FIG. 7, therefore, is a representation of a process for the selective separation and partitioning of a mixture of particles using an AM-EWOD device.

As depicted in step (a) of FIG. 7, a sample droplet 2 is inputted or otherwise generated at a first location within the AM-EWOD device. The sample droplet contains a mixture of species including smaller particles 6 and larger particles 4 to be separated for further analysis in a downstream process. As used herein, a particle may be selected from any suitable or traditionally known particles or beads; such as for example: a latex bead, a paramagnetic bead, a colloidal solid (such as silver, gold), a cell (prokaryotic or eukaryotic), or a biological species such as an enzyme, a nucleic acid, an antibody, a protein, or other such distinguishable entity that may be considered a "discrete" element that may be separated from an aggregation or mixture. Generally, any entity that may constitute the particles 4 or 6 may be utilized within a subsequent reaction scheme or process. In typical examples in which microfluidic diffusion separation is desirably performed, the mixture, for example, may represent fragments or partial fragments of a trypsin digested protein, or the mixture may represent nucleic acid fragments of differing length. Inputting the sample droplet may be implemented by performing an electrowetting operation to prepare the sample droplet from source droplets located within the EWOD device. For example, the sample droplet may be prepared by mixing a source sample with an agent within the EWOD device, and the agent digests the source sample into the first and second particles. Non-limiting examples of such sample preparation include protease digestion of protein, peptidase digestion of peptide, or nuclease digestion of nucleic acid.

Step (a) of FIG. 7 also depicts a collection droplet 8 that is inputted or otherwise generated at a second location within the AM-EWOD device. The collection droplet 8 contains an aqueous fluid into which the mixture of species 4 and 6 is to be separated. Sample droplet 2 may have a generally rectangular profile as generated by the electrowetting forces of the AM-EWOD device, although other shapes which have at least one straight edge also may be used. Collection droplet 8 is generally elongate relative to the sample droplet 2 as also generated by the electrowetting forces of the AM-EWOD device, and collection droplet 8 has at least one straight edge for contacting and merging with the sample droplet 2 without causing agitation of the contents of the respective droplets. The elongate configuration of the collection droplet 8 has an aspect ratio that benefits separation by permitting diffusion from the sample droplet 2 along the length of the collection droplet 8, and further provides a shape that facilitates segmentation when sub-droplets are formed from the collection droplet 8 as further detailed below.

Step (b) of FIG. 7 depicts the bringing into contact of sample droplet 2 with collection droplet 8, which is achieved under control of an AM-EWOD reaction protocol or script. Such a reaction protocol or script typically contains a series of commands that configure control electronics to selectively actuate the requisite array elements within the AM-EWOD device to control the movement of droplets within the device array. Each array element within the device array may be selectively actuated, permitting controlled movement of a target droplet. As shown in step (b), the sample droplet 2 and collection droplet 8 initially may be brought sufficiently close so that the respective menisci of each of the droplets touch but do not fuse. Thus, the mixture of species including the particles 4 and 6 remain contained within sample droplet 2.

Step (c) of FIG. 7 depicts a series of time course events representing the diffusion of the mixture of particles from within sample droplet 2 into the collection droplet 8. At an initial time $t_0$, the respective droplets 2 and 8 are fused or merged to form a merged droplet 9 by operation of the AM-EWOD device in a manner such that bulk movement of the fluid within each droplet does not occur. Once the merged droplet 9 is formed, the AM-EWOD array elements beneath the merged droplet 9 remain actuated to hold the shape of the merged droplet 9 and mitigate possible drift of the merged droplet 9, which otherwise may induce convective mixing of the liquid within the merged droplet. In other words, the merging process is performed to prevent any significant convective mixing. At the initial time of merging $t_0$, the mixture of particles 4 and 6 remains generally within the volume occupied by the previous confines of sample droplet 2. As the merged droplet 9 is held in location and shape, diffusion occurs of the particles 4 and 6 from the previous confines of the sample droplet 2 into the previous confines of the collection droplet 8, but at different diffusion rates due to the difference in particle size (i.e., hydrodynamic radius). For example, time $t_1$ represents an initial separation of particles into the volume previously occupied by collection droplet 8. Particles move by a process of diffusion generally governed by the principles of Brownian motion as dictated by Fick's law. By such principles, smaller particles tend to migrate by diffusion more rapidly as compared with larger particles. Thus, by time $t_2$ a greater proportion of smaller particles 6 has migrated toward the distal end of merged droplet 9 than larger particles 4. In particular, toward the distal end of the merged droplet 9 opposite from where the sample droplet 2 was located, essentially only the smaller particles 6 are present. Depending upon the application, exemplary diffusion time intervals from the initial time $t_0$ to the time $t_2$ may be in a range of five seconds to ten hours.

Step (d) of FIG. 7 depicts a process step by which electrowetting forces are employed to segment or separate off a leaving droplet 10 from the distal end of the merged droplet 9. Because of the different diffusion migration rates, leaving droplet 10 contains largely only the particles 4 separated out from the original mixture that also included the particles 6, and the leaving droplet 10 may be transferred to further downstream processes for analysis. In one example utilizing the above processes, the leaving droplet 10 may be used as another sample droplet 2 for a subsequent separation process to enhance the particle separation. The steps outlined in FIG. 7 thus may be repeated in an iterative fashion as appropriate, with one or more leaving droplets 10 becoming the sample droplet 2 for further separation of particles 4 and 6.

Figure 8:
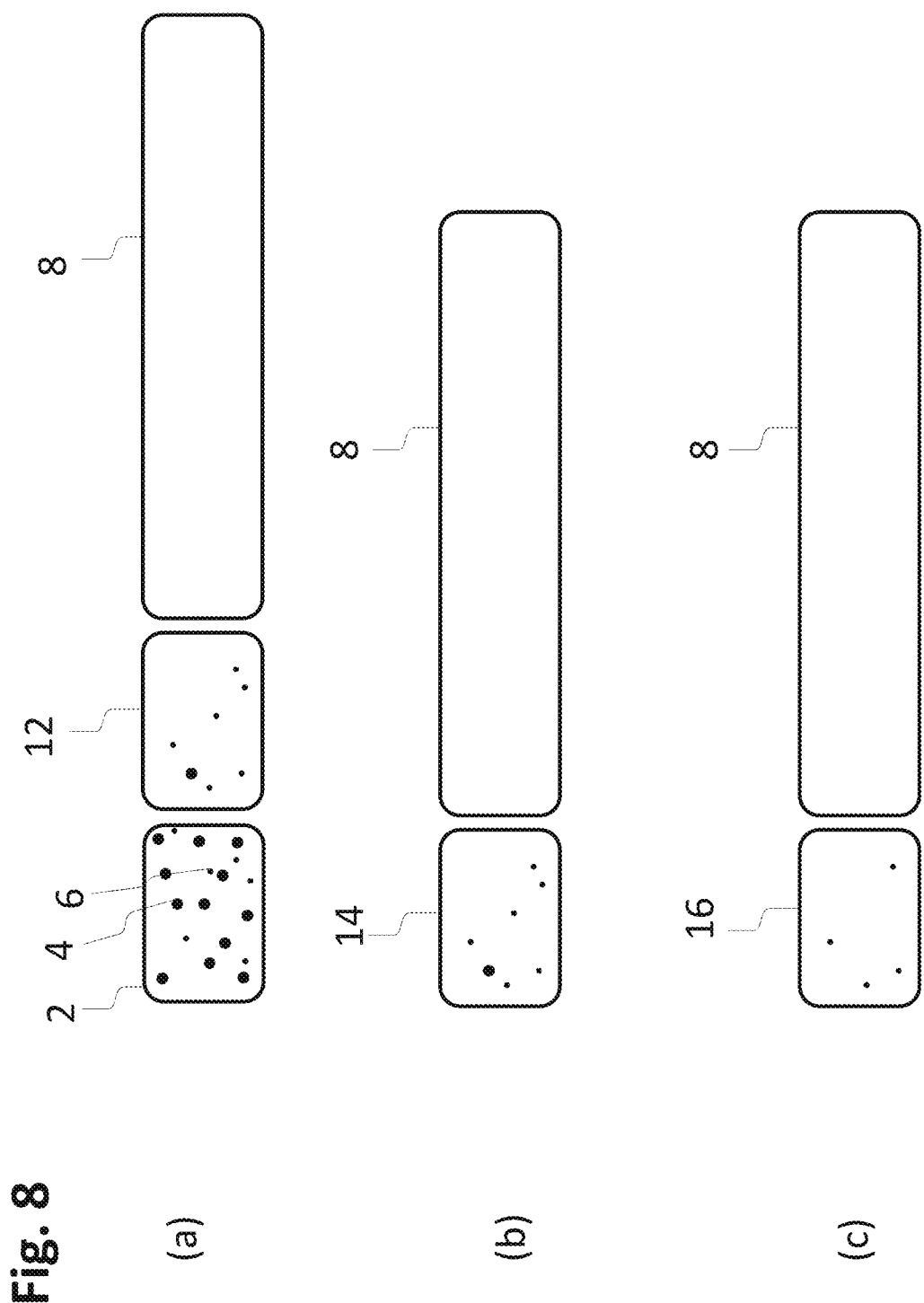
FIG. 8 is a drawing depicting another exemplary method of microfluidic diffusion separation in accordance with embodiments of the present invention, illustrated as a sequence of steps (a) through (c) and illustrating nested separation processing.

FIG. 8 is a drawing depicting another exemplary method of microfluidic diffusion separation in accordance with embodiments of the present invention, illustrated as a sequence of steps (a) through (c). The example of FIG. 8 employs electrowetting operations comparable to that of FIG. 7, but with an alternative forming of the leaving droplet. In this embodiment, step (a) of FIG. 8 depicts a process in which a leaving droplet 12 is segmented at a location from within the merged droplet 9 of FIG. 7 other than from the distal end as depicted in step (d) of FIG. 7. The AM-EWOD device may be operated according to a specific reaction protocol or script to separate a leaving droplet from any position along the length of the merged droplet. When leaving droplet 12 is separated from the merged droplet, such leaving droplet 12 may contain a more diverse population of particles as compared to the separation of leaving droplet 10 from the distal end of the merged droplet as shown in FIG. 7. However, the time required to acquire the leaving droplet 12 of FIG. 8 may be significantly reduced as compared to the time required to acquire leaving droplet 10 of FIG. 7.

The leaving droplet 12 then may be used as a sample droplet for further separation processing. Step (b) of FIG. 8 depicts a first nested separation process, wherein leaving droplet 12 separated at step (a) is used as a sample droplet 14 for a secondary separation process, which may be performed comparably as previously described. Step (c) of FIG. 8 depicts a further nested operation, wherein a sample droplet 16 has been acquired following merging of sample droplet 14 and collection droplet 8 in the secondary separation process of step (b), and permitting further diffusion from sample droplet 16 into the collection droplet 8. As depicted, sample droplet 16 may contain significantly fewer particles as compared to the initial sample droplet 2, but such particles generally are expected to be of a more uniform size due to an increased number of successively nested separation steps, in which leaving droplets are removed from the merged droplet after limited intervals of time, such as for example at time $t_1$ in FIG. 7, rather than waiting until a more complete separation time, such as for example time $t_2$ in FIG. 7.

In this manner, multiple nested separation operations such as depicted in FIG. 8 may be performed to achieve a comparable result as awaiting the more complete separation as shown in FIG. 7. Such a nested process of FIG. 8 ultimately may result in a more effective and/or efficient separation in a fixed period of time as compared with a unitary process as depicted by FIG. 7, wherein a mixture is allowed to fully diffuse along the length of the merged droplet 9.

The previous embodiments are illustrative of "passive" microfluidic diffusion separation processes, in which the separation occurs only by diffusion. In a another embodiment, the top plate of an AM-EWOD device is provided with apertures within the dielectric insulation layer beneath a pair of electrodes (− and +) placed on the external surface of the top plate, through which a voltage may be delivered to a droplet below and bridging the respective electrodes, to effect electrophoretic or dielectrophoretic (DEP) separation of species suspended within such droplet. In accordance with such principles, FIG. 9 is a drawing depicting another exemplary method of microfluidic diffusion separation in accordance with embodiments of the present invention, illustrated as a sequence of steps (a) through (d) and using an AM-EWOD device modified to apply a voltage across a droplet to enhance the separation process.

Figure 9:
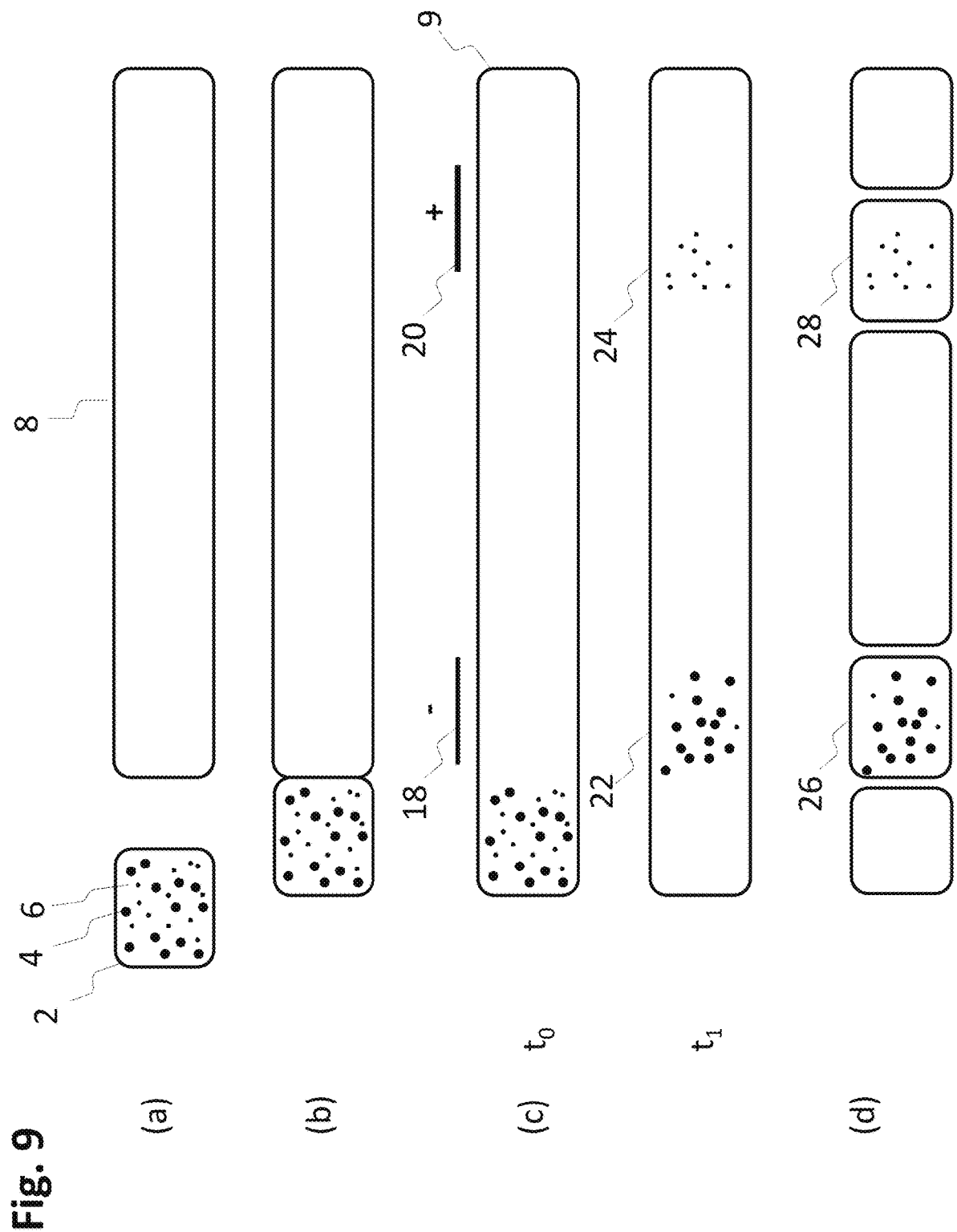
FIG. 9 is a drawing depicting another exemplary method of microfluidic diffusion separation in accordance with embodiments of the present invention, illustrated as a sequence of steps (a) through (d) and using an AM-EWOD device modified to apply a voltage across a droplet.

The process of FIG. 9 initially proceeds comparably as described with respect to FIG. 7. In step (a) of FIG. 9, the sample droplet 2 and collection droplet 8 are inputted or otherwise generated at their respective locations within the AM-EWOD device. Step (b) of FIG. 9 likewise depicts the bringing into contact of sample droplet 2 with collection droplet 8, which is achieved under control of an AM-EWOD reaction protocol or script. Step (c) of FIG. 9 depicts a series of time course events representing the movement of the mixture of particles from within sample droplet 2 into the collection droplet 8. At the initial time $t_0$, similarly as above, the respective droplets 2 and 8 are fused or merged to form a merged droplet 9 by operation of the AM-EWOD device in a manner such that bulk movement of the fluid within each droplet does not occur, and convective mixing is prevented. At the initial time of merging $t_0$, the mixture of particles 4 and 6 remains generally within the volume occupied by the previous confines of sample droplet 2.

In the example of FIG. 9, the AM-EWOD device further is configured to apply a voltage across the merged droplet 9 to effect separation of elements by electrophoresis or DEP as appropriate. Following the forming of the merged droplet 9, a voltage is applied between electrodes 18 and 20 as depicted in step (c) of FIG. 9 at time $t_0$. In this example, electrode 18 is a negative electrode and electrode 20 is a positive electrode, although the polarity may be varied. By the process of by electrophoresis or DEP, at time $t_1$ the particles from the initial sample droplet are essentially separated according to size (or mass/charge density) under the influence of the applied voltage. Unlike the passive embodiments described with respect to FIGS. 7 and 8, in which diffusion is relied on to effect separation of the particles within the merged droplet, FIG. 9 employs "active" separation of particles by the applied voltage, which yields discrete bands 22 and 24 within the merged droplet 9 of generally homogeneous populations of particles 4 and 6 respectively. At step (d) of FIG. 9, the bands 22 and 24 are segmented or separated from the merged droplet 9 into discrete leaving droplets 26 and 28. Leaving droplets 26 and 28 may be subjected to further separation processes to refine the essential purity or homogeneity with respect to a subset of particles, or leaving droplets 26 and/or 28 may be directed to downstream analysis as appropriate.

Thus, in the active separation process of FIG. 9 the merged droplet 9 may be located beneath the pair of electrodes 18 and 20 to which a voltage is applied to accelerate separation of species from the sample droplet 2 into the collection droplet 8, relative to the passive separation processes that employ diffusion alone. Although an electrical gradient is used to enhanced separation in this example, other gradients such as a thermal gradient may be employed as may be suitable for any particular application. As depicted in step (d) of FIG. 9, leaving droplets 26 and 28 may be segmented from the merged droplet 9. The AM-EWOD device may be configured by a script to separate a leaving droplet from any position along the length of the merged droplet 9. Unlike traditional microfluidic devices, AM-EWOD implementation offers greater flexibility with respect to droplet manipulation. A script may be developed to effect separation of droplets at any position along the length of a merged droplet. With such flexibility, remaining portions of the sample droplet 2 and collection droplet 8, once leaving droplets 26 and 28 have been removed, may be reunited such that continued separation by diffusion may continue similarly as described with respect to FIGS. 7 and 8, or the active separation process of FIG. 9 may be repeated.

In a further aspect of the invention, an initial separation by diffusion as described with reference to FIG. 7 or 8 may be performed. Thereafter, a leaving droplet may be merged with a new collection droplet 8, and the merged droplet then is exposed to an applied electric potential or other gradient to further separate the particles suspended within the merged droplet as described with reference to FIG. 9. In yet a further embodiment, an initial separation by electrophoresis may be followed by a separation by diffusion. Generally, therefore, the processes described with respect to FIGS. 7, 8, and 9 may be combined and performed in any order as may be suitable for any particular application.

Figure 10:
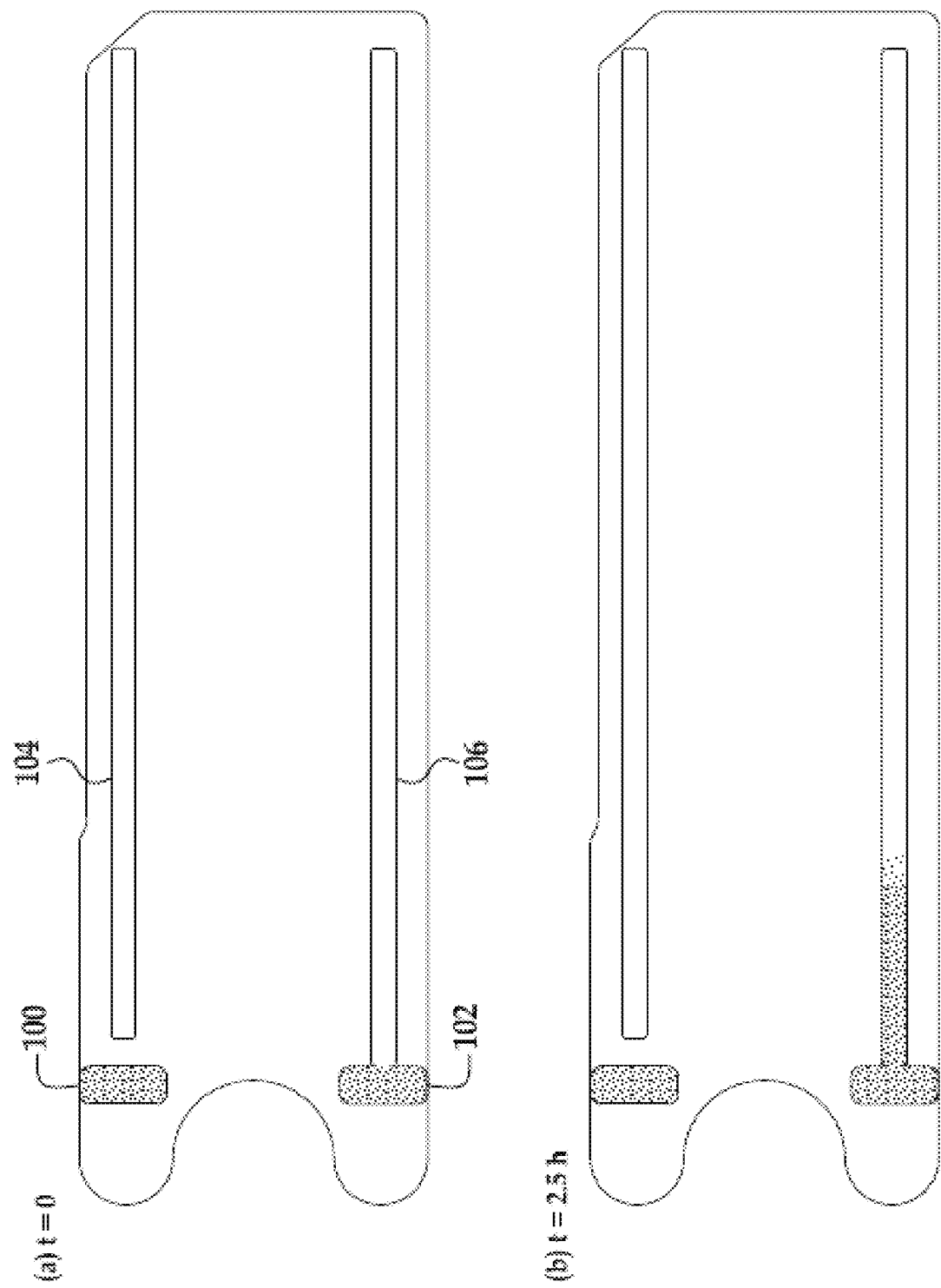
FIG. 10 is a drawing depicting another exemplary method of microfluidic diffusion separation in accordance with embodiments of the present invention, illustrated as a sequence of steps (a) through (d) and in connection with separation of a sample of fluorescent dye.
Figure 10:
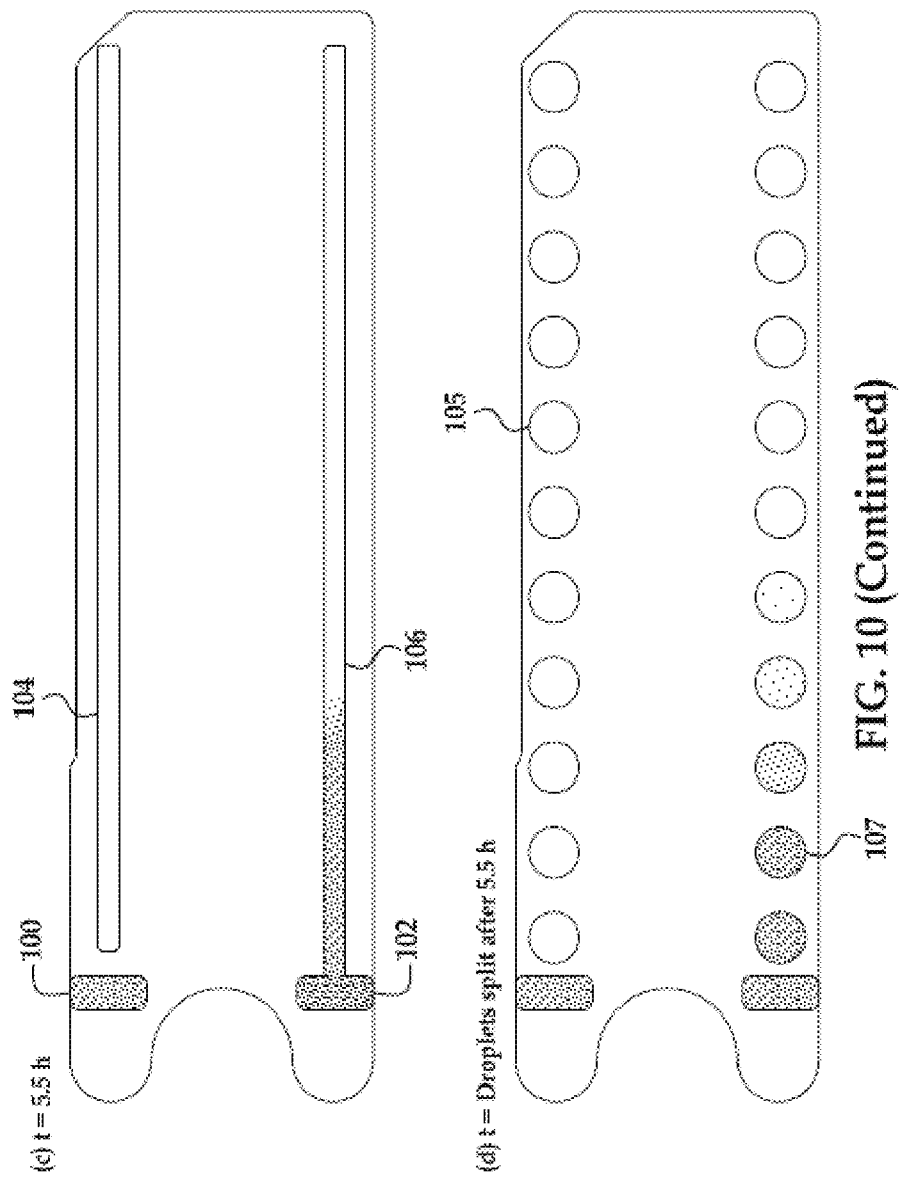

FIG. 10 is a drawing depicting another exemplary method of microfluidic diffusion separation in accordance with embodiments of the present invention, illustrated as a sequence of steps (a) through (d) and in connection with separation of a sample of fluorescent dye. In step (a) of FIG. 10, two sample droplets 100 and 102 including a fluorescent dye are inputted into an AM-EWOD device array at locations on the device array. Two elongate collection droplets 104 and 106 containing a buffer also are inputted into the device array at locations respectively adjacent to the sample droplets 100 and 102. In this example to show AM-EWOD device usage, at an initial time of t=0, one of the sample droplets is merged with the respective collection droplet (in this example, sample droplet 102 is merged with collection droplet 106) by selective array element actuation to permit such droplets to merge without causing bulk agitation of the dye within the sample droplet. Further in this example, the other pair of sample droplet 100 and collection droplet 104 are not merged to demonstrate that the dye does not diffuse into the collection droplet through the filler fluid in which the droplets are surrounded. In this example of fluorescent dyes, the filler fluid may be an oil such as dodecane.

Step (b) of FIG. 10 depicts the progress of diffusion of the dye from the sample droplet 102 into the buffer within the collection droplet 106 after a first time interval, which in this example is 2.5 hours. Again, because the sample droplet 100 and collection droplet 104 were not merged, there is no diffusion of the dye from sample droplet 100 into collection droplet 104. Step (c) of FIG. 10 depicts further distribution of the dye by diffusion along the length of the collection droplet 106, following a second time interval since merging of the sample and collection droplets 102 and 106, which in this example is 5.5 hours. From the image corresponding to step (c), it is observed that the intensity of the dye at the leading edge of the diffusion (right hand end in the figure) is more diffuse, as the dye continues to mix with the buffer into which the dye is diffusing.

Once a sufficient amount of dye has diffused into the collection droplet 106, the collection droplets 104 and 106 can be divided into individual or segmented droplets by operation of the AM-EWOD device. Accordingly, step (d) of FIG. 10 depicts the AM-EWOD device array following segmentation of the collection droplet 104 into a series of discrete circular segmented droplets 105, and collection droplet 106 into a series of discrete circular segmented droplets 107, under the control of the selective actuation of the device array elements. As referenced above, none of the dye from sample droplet 100 has diffused into the collection droplet 104 as such droplets were not merged initially, which is depicted by the absence of fluorescence in any of the segmented droplets 105. Accordingly, segmented droplets 105 that are divided out of collection droplet 104 do not contain any dye. Because of the progression of the diffusion through the collection droplet 106, the first and second segmented droplets 107 divided out from the collection droplet 106 closest to the sample droplet 102 have approximately uniform fluorescence intensity as compared with the sample droplet 102. In contrast, the fourth and fifth segmented droplets 107 farther from the sample droplet 102 exhibit increasingly lower fluorescence intensity. No discernible fluorescent dye has travelled the full length of the collection droplet 106 during the timeframe of the diffusion separation through the time at step (d), and thus the sixth through last segmented droplets 107 also do not contain any discernible dye.

Figure 11:
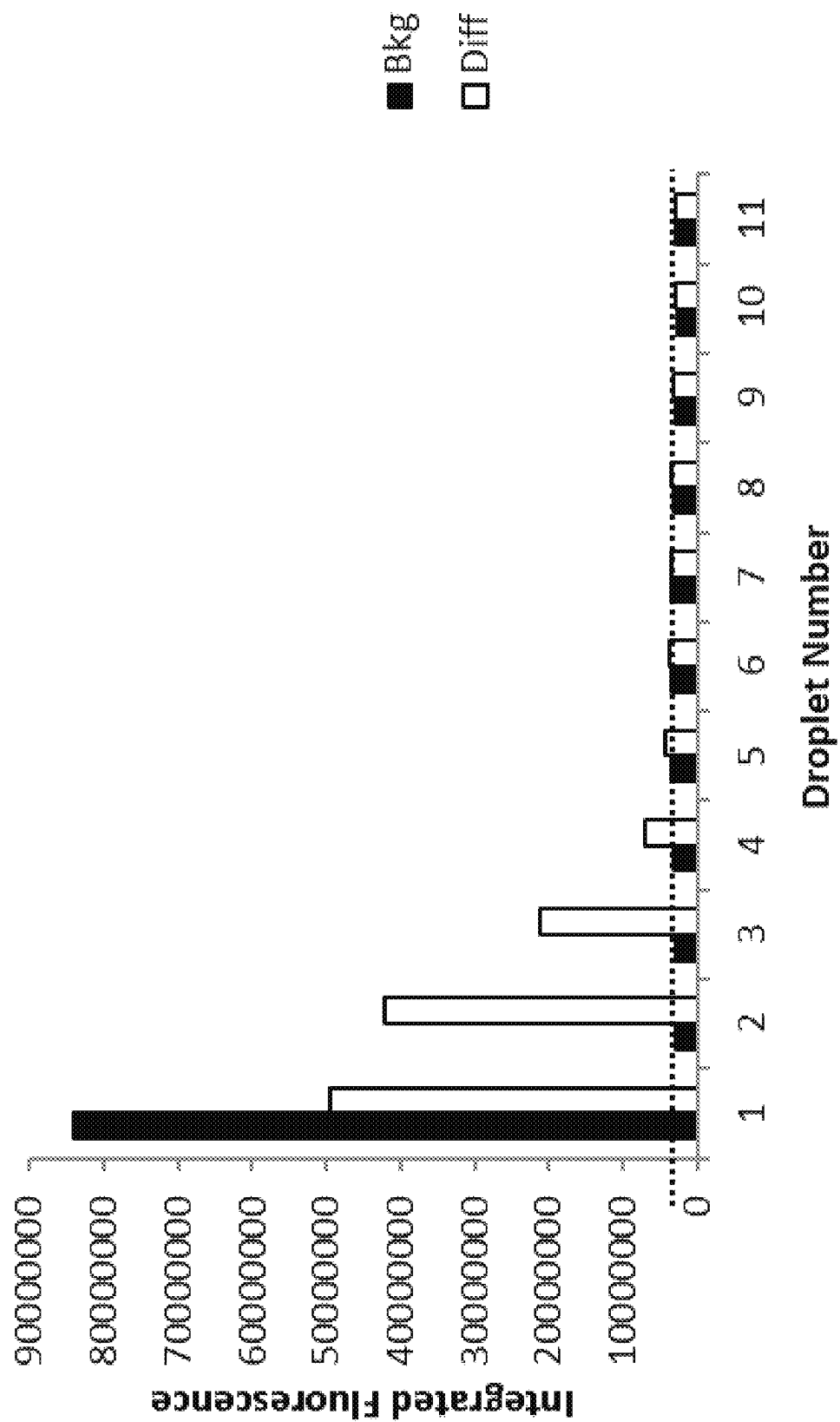
FIG. 11 is a graphical representation of fluorescence intensity of segmented droplets divided out of the collection droplets with respect to step (d) of FIG. 10.
Figure 12:
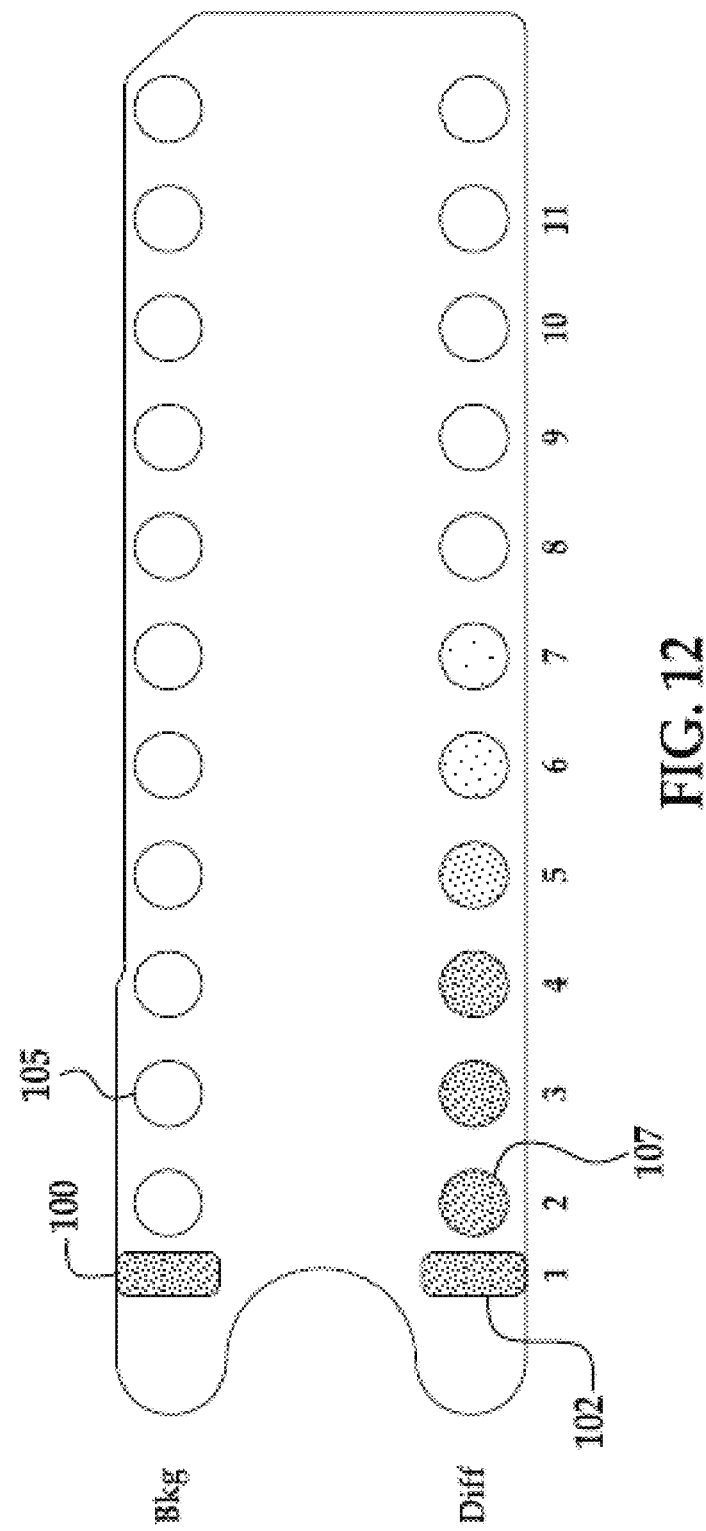
FIG. 12 is a drawing that indicates the numbering of the respective segmented droplets in the graph of FIG. 11.

FIG. 11 is a graphical representation of the fluorescence intensity of the respective segmented droplets 105 and 107 separated or divided out of the collection droplets 104 and 106, as described above with respect to step (d) of FIG. 10. FIG. 12 is a drawing that indicates the numbering of the respective segmented droplets in the graph of FIG. 11. In this example, the fluorescence intensity is determined as the integrated fluorescence of each respective droplet. The reference "Bkg" with solid fill denotes a background control corresponding to sample droplet 100 and collection droplet 104, which were not merged and thus no diffusion occurred. The reference "Diff" with no fill denotes the microfluidic diffusion separation process corresponding to sample droplet 102 and collection droplet 106, which were merged and thus diffusion has occurred. The dashed line in FIG. 11 represents the extent of default background fluorescence of the system.

In FIG. 11 droplet number 1 represents the sample droplets 100 (Bkg) and 102 (Diff) at the time corresponding to step (d) of FIG. 10. At such time, the fluorescence intensity signal measured for the sample droplet 100 (Bkg) is greater than the fluorescence intensity signal measured for the sample droplet 102 (Diff). This difference in fluorescence intensity signal is due to no dye material having been diffused out from the Bkg sample droplet 100. The fluorescence intensity signal for sample droplet 100 (droplet 1 Bkg) is thus the primary fluorescence of the undiluted sample droplets. The fluorescence intensity signal of the Diff sample droplet 102 is reduced from the undiluted fluorescence intensity due to diffusion (and thus dilution) of dye into the collection droplet 106.

The fluorescence intensity of droplets 2-11 of the Bkg droplet series 105 is essentially the same in each droplet and corresponds to the default background fluorescence of the system (dashed line), indicating there was no discernible diffusion of dye across the sample droplet-filler fluid-collection droplet interface between sample droplet 100 and collection droplet 104. The fluorescence intensity of droplets 2-5 of the Diff droplet series 107 indicates a fluorescence intensity difference as compared with the Bkg droplet series because of diffusion from sample droplet 102 into collection droplet 106. The fluorescence intensity difference for Diff droplet 5 is small, but nonetheless is distinguishable, and Diff fluorescence intensity is greater the closer a Diff segmented droplet 107 is to the sample droplet 102. The fluorescence intensity of droplets 6-11 for both the Bkg and Diff series have no discernible difference and correspond to the background fluorescence under the experimental conditions used in this example, as there has not been sufficient time for any discernible diffusion of the dye farther from the sample droplet 102. The data from FIGS. 10-12 demonstrate that using AM-EWOD device control, diffusion of dye from a sample droplet into a collection droplet can be controlled and monitored using AM-EWOD technology by selective actuation of the array elements.

FIG. 13 is a drawing depicting another exemplary method of microfluidic diffusion separation in accordance with embodiments of the present invention, illustrated as a sequence of steps (a) through (d) and employing a droplet interface bilayer. In the example of FIG. 13, similarly to previous embodiments, a sample droplet 2 includes a mixture of larger particles 4 and smaller particles 6, as shown in step (a). In step (b) of FIG. 13, the sample droplet is brought into contact with a collection droplet 8 by selective actuation of elements of the AM-EWOD device. In this example, the sample and collection droplets are brought sufficiently close to each other such that the droplet interfaces touch, forming a droplet interface bilayer (DIB) 11. In this example that employs forming a DIB, the two droplets are brought together so that they remain touching, but without actual merging. By appropriate choice of surfactants in the system that may be incorporated into the droplets or the filler fluid, a lipid bilayer forms the DIB at the interface of the sample and collection droplets. DIBs have multiple uses in EWOD applications, including for example forming structures for patch-clamp sensing, for example as described in Martel and Cross, Biomicrofluidics, 6, 012813 (2012), or for sequencing DNA when a nanopore is inserted into the DIB, as described for example in GB1721649.0.

Unlike the embodiment described above with respect to FIG. 7, therefore, in the embodiment of FIG. 13 the sample and collection droplets do not merge, but remain discrete with a DIB formed at the droplet interface. The mixture of particles within sample droplet 2, therefore, separate into collection droplet 8 by a process of dialysis or selective separation based on the characteristics of the DIB, as the DIB is formed to contain pores or ion channels that control the passage of certain species or particles through the DIB based on particle size (hydrodynamic radius) and/or other particle properties. Unlike the embodiment of FIG. 7, all particle populations within the sample droplet 2 of FIG. 13 will not pass into collection droplet 8 insofar as certain particle populations are not able to pass through the DIB.

As depicted in step (c) of FIG. 13, at an initial time $t_0$, a DIB 11 is formed at the interface of sample droplet 2 and collection droplet 8 as described above. At a subsequent time $t_1$, a selected population of particles, in this example the smaller particles 6, have migrated across the DIB 11 into the collection droplet 8, and a non-selected population of particles, in this example the larger particles 4, generally do not pass through the DIB 11. The selected population of particles 6 may further disperse throughout collection droplet 8 by diffusion over time, and after a further time $t_2$ a leaving droplet 10 may be segmented or separated from collection droplet 8 for downstream processing comparably as in previous embodiments.

Process features as described above with respect to the embodiments of FIGS. 8 and 9 also may be applied in combination with the embodiment of FIG. 13 employing the DIB. For example, separation of a mixture of particles across a DIB may be modified such that after an initial separation, a leaving droplet may be segregated from within the collection droplet at any location along the collection droplet without disrupting the DIB. Furthermore, the transfer of the selected population of particles across the DIB may be enhanced or otherwise modified by application of a voltage or other gradient either through the collection droplet, or across the DIB. Additionally, alteration of the composition of the solution within the respective droplets may be used to cause dialysis or osmosis to selectively partition the mixture of sample particles within the collection droplet.

In each of the foregoing microfluidic diffusion separation methods depicted in FIGS. 7-13, the beneficial characteristics of an AM-EWOD device such as depicted in FIGS. 1-6 are utilized to achieve the selective droplet dispensing and spatial droplet manipulations within the element array of the AM-EWOD device. In use, a two-dimensional array element array (x, y) defines areas within which droplet manipulation operations may be performed. The systems and processes of the present invention may be implemented within an AM-EWOD element array of any (x, y) dimensional size. The two-dimensional size determines the respective volume of fluid that may be controlled within the device. Each array element within the element array may be associated with a unique reference data item for tracking droplet operations at a given array element. Such data may be used by an electronic controller or processor to permit the selective movement of one or more than one droplet from a first location to a second location on the element array of the AM-EWOD device, according to the process or reaction scheme in which the liquid droplets are being utilized.

Typically, the processor is configured to follow a reaction protocol or script that is embodied as program code stored on a non-transitory computer readable medium, such as described with respect to FIG. 1. In accordance with the reaction protocol, the processor generates control signals for applying selective actuation voltages to the array elements of the AM-EWOD device to generate electrowetting forces to perform the desired droplet manipulation operations. The reaction protocol may contain a series of one or more droplet manipulation operations that may be performed in sequence, or simultaneously, to achieve a desired outcome in accordance with the reaction protocol. The droplet manipulation operations may include, for example, dispensing droplets from an initial reservoir and moving selected droplets as needed to perform the various droplet merging, DIB forming, and leaving droplet segmenting operations described above with respect to the various embodiments.

Examples of advantages of the methods of the present invention include the following. Convective mixing of the sample and collection droplets is minimized to provide an enhanced particle separation as compared to conventional configurations. As a result, less reagents are needed and the microfluidic diffusion separation can be performed using very small liquid volumes, which reduces cost and complexity of reaction protocols. AM-EWOD devices provide for easy formation and maintaining of elongate collection droplets, which permits effective diffusion and segregation of droplets containing the desired particles. Using AM-EWOD implementation further permits sample pre-processing and downstream product processing on the same device, as pre-processing, particle separation, and downstream processing can be performed in separate areas of the AM-EWOD device by the selective actuation of the array elements to perform the requisite droplet manipulation operations.

The following represent non-limiting examples of uses of embodiments of the present invention.

Determination of Protein Hydrodynamic Radius

The determination of the hydrodynamic radius of a mixture of proteins by diffusion into a buffer is performed within an AM-EWOD device. As described with respect to FIG. 7, sample droplets containing different concentrations of the protein of interest are prepared within the AM-EWOD device. Initially, a stock solution of the monomeric protein is dispensed into the AM-EWOD device. From this stock droplet, several further droplets are dispensed, each being mixed into defined volumes of buffer to yield a concentration series. Elongate collection droplets containing buffer also are dispensed from a stock droplet of buffer that had been inputted to the AM-EWOD device. Each respective sample droplet is brought into contact with a collection droplet. At an initial time $t_0$, actuation of array elements of the AM-EWOD device is performed at the interfaces between each pair of droplets to cause merging, without agitation or convective mixing of the respective droplets. At a time $t_1$, droplets are segmented and separated at different positional distances along the length of the collection droplet, as depicted in FIG. 12 for example. Each segmented droplet is then combined with a fluorescent dye to label any protein molecules present in each respective droplet, and the fluorescence intensity of each droplet is determined, as described above in connection with FIGS. 10-12. The relative fluorescence intensity of each respective droplet is then used to determine the distance travelled along the respective collection droplets in the defined interval of time.

The experiment may be repeated with different proteins of different molecular mass, and the distance travelled per unit time of each protein, as determined by measuring the fluorescence intensity after mixing the respective segmented droplets with dye, is correlated with relative molecular mass. The diffusion distance per unit time is used to determine the hydrodynamic radius of each respective protein.

Transport Across Droplet Interface Bilayer

An investigation of the transport of aqueous phase elements between droplets suspended in a non-aqueous supporting medium is conducted. Phospholipid stabilized water in oil droplets are dispensed within an AM-EWOD device. Such droplets are used to produce droplet interface bilayers (DIBs) by the bringing together of individual droplets within the AM-EWOD device. DIBs are used to study diffusion of a solute across the bilayer membrane, as well as to study active transport through pores or ion channels formed in the DIB.

In a first experiment, diffusion of fluorescein or calcein through a bilayer is investigated. Under conditions of neutral pH, calcein, a derivative of fluorescein, is generally more polar than fluorescein. Previous investigations have demonstrated the selective permeability of lipid bilayers to molecules with lower polarity as compared to those with higher polarity (*Scientific Reports* volume 5, Article number: 9951 (2015)). Thus, fluorescein may more readily diffuse through a bilayer, whereas calcein may not. Three populations of droplets are dispensed within an AM-EWOD device. A first population contains buffer, a second population contains fluorescein at 100 μM concentration, and a third population contains calcein at 100 μM concentration. Droplets containing buffer are brought into contact respectively with droplets containing fluorescein or calcein, under control of the AM-EWOD device.

Fluorescence intensity is determined at time $t_0$, $t_1$ (30 minutes) and $t_2$ (60 minutes), with excitation wavelength 494 nm and emission wavelength 515 nm. It is determined that after 30 minutes fluorescence could be detected from the buffer containing droplets when DIBs are formed between a fluorescein containing droplet and a buffer-containing droplet; after 60 minutes the fluorescence intensity had increased, as further fluorescein diffused across the bilayer into the buffer. However, even after 60 minutes there is no detectable fluorescence from the buffer containing droplets that had formed DIBs with calcein containing droplets.

In a second experiment, two droplet populations are dispensed into an AM-EWOD device. One population of droplets comprises a mixture of alpha hemolysin, single strand nucleic acid (ssDNA) and double strand nucleic acid (dsDNA). Another population of droplets comprises buffer only. Droplets are brought in close contact within the AM-EWOD device such that a droplet interface bilayer forms between them. When a droplet comprising alpha hemolysin, ssDNA and dsDNA comes in contact with a droplet comprising buffer, the alpha hemolysin selectively inserts across the lipid bilayer, providing a pore between the droplets. ssDNA passes through the pore into the buffer containing droplet, whereas dsDNA blocks the pore. Analysis is performed either by separating droplets and then determining whether a droplet comprises a mixture of ssDNA and dsDNA or ssDNA only, as a result of transport through alpha hemolysin pores inserted in the bilayer. Droplets are evaluated, for example, using assay procedures such as QUANTIFLUOR® dsDNA and ssDNA from Promega UK. Alternatively, it is possible to measure a current that flows when a voltage is applied across droplets held together as a DIB. In this case, when ssDNA passes through the alpha hemolysin pore there is a change in current flowing across the membrane.

The results indicate that successful formation of bilayer lipid membranes within the AM-EWOD device is achieved—firstly, as demonstrated by the selective diffusion of fluorescein, but not calcein, across the bilayer; and secondly by the successful insertion of alpha hemolysin into a bilayer, with subsequent transport of ssDNA from one droplet to another.

Diffusion Immunoassay

Within an AM-EWOD device, a diffusion immunoassay is performed by bringing together droplets containing respectively a slowly diffusing antibody and a rapidly diffusing antigen. Antigen is prepared as a conjugate with a fluorescent label to permit monitoring of relative fluorescence intensity across the width of the droplet. Droplets of stock solutions of each species are initially dispensed into the AM-EWOD device. Further droplets of each element are then dispensed from the stock droplet, each of which is mixed with a respective droplet of buffer to yield a series of droplets of different concentration with respect to the antibody or labelled antigen respectively.

Droplets of each respective dilution of antibody and antigen are brought into contact within the AM-EWOD device, and at an initial time $t_0$ the array elements at the junctions of each respective pair of droplets are de-actuated and re-actuated to cause the droplets to fuse without bulk agitation. At a time $t_1$, each combined droplet is segmented and the extent of fluorescence at discrete distances from the combined droplet center line are determined. The more rapidly diffusing labelled antigen is expected to migrate further into the droplet containing antibody, than is antibody expected to diffuse into the droplet containing labelled antigen. Analyses of respective droplets demonstrate a relative fluorescence intensity profile as a function of distance from the droplet center line.

In a further experiment, labelled antigen is mixed with a sample containing unlabelled antigen to create a series of droplets having a fixed amount of labelled antigen and with a serial dilution of unlabelled antigen, and the above is repeated. In this context a competition occurs for antibody binding to labelled or unlabelled antigen. The respective rate of migration of the labelled and unlabelled antigen into the antibody reveals a different fluorescence intensity profile per unit distance due to the competition for binding between labelled and unlabelled antigen. Based on the recorded fluorescence intensity profiles, a calibration model can be developed for the target antigen.

Clinical samples are subsequently analyzed using the diffusion immunoassay. Labelled antigens are prepared which correspond with the target of the assay, and a series of dilutions are prepared comprising a fixed concentration of labelled antigen with a serial dilution of the clinical sample of interest. Within the AM-EWOD device, droplets of antibody and clinical sample/labelled antigen are dispensed and brought into contact. At an initial time $t_0$, droplets are merged without causing agitation of the contents, and diffusion of antigen into antibody is initiated. At a time $t_1$, the relative fluorescence intensity across the width of the droplet is determined. Fluorescence intensity profiles are compared with the calibration model for the particular antigen, from which the concentration or amount of the target antigen is determined.

An aspect of the invention, therefore, is a method of operating an electrowetting on dielectric (EWOD) device to perform a method of microfluidic diffusion separation. In exemplary embodiments, the method includes the steps of: inputting a sample droplet into the EWOD device, wherein the sample droplet includes a mixture of particles including first particles and second particles that are different from each other; inputting a collection droplet into the EWOD device; performing an electrowetting operation to bring the sample droplet into contact with the collection droplet; at an initial time, initiating a process of particle separation by which a portion of the sample droplet is introduced into the collection droplet, wherein the first particles move through the collection droplet at a rate different from the second particles; and after a time interval from the initial time, performing an electrowetting operation to segment a leaving droplet from the collection droplet, wherein the leaving droplet has a higher concentration of the first particles relative to the second particles as compared to a concentration of the first particles relative to the second particles in the sample droplet at the initial time. The method may include one or more of the following features, either individually or in combination.

In an exemplary embodiment of the method, performing an electrowetting operation to bring the sample droplet into contact with the collection droplet comprises merging the sample droplet and the collection droplet, and the separation process comprises diffusion of the first and second particles of the sample droplet into the collection droplet.

In an exemplary embodiment of the method, the electrowetting operation to merge the sample droplet and the collection droplet minimizes bulk disturbance and convective mixing of the sample droplet and the collection droplet.

In an exemplary embodiment of the method, performing an electrowetting operation to bring the sample droplet into contact with the collection droplet comprises forming a droplet interface bilayer (DIB) at an interface of the sample droplet and the collection droplet, and the separation process comprises selective movement of either the first particles or the second particles across the DIB.

In an exemplary embodiment of the method, the separation process includes applying a gradient within the collection droplet or between the sample droplet and the collection droplet.

In an exemplary embodiment of the method, the gradient is a voltage gradient formed by electrodes located within the EWOD device.

In an exemplary embodiment of the method, the separation process includes electrophoresis and/or dielectrophoresis.

In an exemplary embodiment of the method, the method further includes performing an electrowetting operation to transfer the leaving droplet to another location on the EWOD device for downstream processing.

In an exemplary embodiment of the method, the time interval is in a range of five seconds to ten hours.

In an exemplary embodiment of the method, inputting the sample droplet comprises performing an electrowetting operation to prepare the sample droplet from source droplets within the EWOD device.

In an exemplary embodiment of the method, preparing the sample droplet comprises mixing a source sample with an agent within the EWOD device, and the agent digests the source sample into the first and second particles.

In an exemplary embodiment of the method, preparing the sample droplet comprises protease digestion of protein, peptidase digestion of peptide, or nuclease digestion of nucleic acid.

In an exemplary embodiment of the method, the first and/or second particles comprise a protein or a nucleic acid.

In an exemplary embodiment of the method, the sample droplet includes a fluorescent dye, and the method further comprises measuring a fluorescence intensity of the leaving droplet.

In an exemplary embodiment of the method, the leaving droplet is utilized as the sample droplet in a subsequent separation process performed in accordance with any of the embodiments.

In an exemplary embodiment of the method, the separation process is sequentially repeated, and each subsequently separated leaving droplet becomes the sample droplet for a next subsequent separation process.

Another aspect of the invention is a microfluidic system including an electro-wetting on dielectric (EWOD) device comprising an element array configured to receive liquid droplets, the element array comprising a plurality of individual array elements; and a control system configured to perform electrowetting operations by controlling actuation voltages applied to the element array to perform manipulation operations as to liquid droplets present on the element array, whereby the control system is configured to perform the method according to any of the embodiments. Another aspect of the invention is a non-transitory computer-readable medium storing program code which is executed by a processing device for controlling actuation voltages applied to array elements of an element array of an electro-wetting on dielectric (EWOD) device the program code being executable by the processing device to perform the method according to any of the embodiments.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The described embodiments could be used to provide an enhanced AM-EWOD device. The AM-EWOD device could form a part of a lab-on-a-chip system. Such devices could be used for optical detection of biochemical or physiological materials, such as for cell detection and cell counting. Applications include healthcare diagnostic testing, material testing, chemical or biochemical material synthesis, proteomics, tools for research in life sciences and forensic science.

REFERENCE SIGNS LIST

2—sample droplet
4—larger particles
6—smaller particles
8—collection droplet
9—merged droplet
10—leaving droplet
12—alternative leaving droplet
14—secondary process sample droplet
16—another sample droplet
18—first electrode
20—second electrode
22—discrete band of first particle
24—discrete band of second particles
26—first leaving droplet
28—second leaving droplet
32—reader
34—cartridge
35—external sensor module
36—AM-EWOD device
38—control electronics
40—storage device
44—lower substrate assembly
46—thin film electronics
48—array element electrodes
48A—array element electrode
48B—array element electrode
50—two-dimensional element array
51—array element
52—liquid droplet
54—top substrate
56—spacer
58—reference electrode
60—non-polar fluid
62—insulator layer
64—first hydrophobic coating
66—contact angle
68—second hydrophobic coating
70A—electrical load with droplet present
70B—electrical load without droplet present
72—array element circuit
74—integrated row driver
76—column driver
78—integrated sensor row addressing
80—column detection circuits
82—serial interface
84—voltage supply interface
86—connecting wires
88—actuation circuit
90—droplet sensing circuit
100—sample droplet
102—sample droplet
104—elongate collection droplet
105—circular segmented droplets
106—elongate collection droplet
107—discrete circular segmented droplets

What is claimed is:

1. A method of operating an electrowetting on dielectric (EWOD) device comprising the steps of:
    inputting a sample droplet into the EWOD device, wherein the sample droplet includes a mixture of particles including first particles and second particles that are different from each other;
    inputting a collection droplet into the EWOD device;
    performing an electrowetting operation to bring the sample droplet into contact with the collection droplet;
    at an initial time, initiating a process of particle separation by which a portion of the sample droplet is introduced into the collection droplet, wherein the first particles move through the collection droplet at a rate different from the second particles; and
    after a time interval from the initial time, performing an electrowetting operation to segment a leaving droplet from the collection droplet, wherein the leaving droplet has a higher concentration of the first particles relative to the second particles as compared to a concentration of the first particles relative to the second particles in the sample droplet at the initial time;

wherein performing an electrowetting operation to bring the sample droplet into contact with the collection droplet comprises merging the sample droplet and the collection droplet, and the separation process comprises passive diffusion of the first and second particles of the sample droplet into the collection droplet;

wherein the first particles have a different hydrodynamic radius from the second particles such that the first and second particles passively diffuse in the collection droplet at different diffusion rates until there is separation of the first and second particles to form the leaving droplet having the higher concentration of the first particles relative to the second particles.

2. The method of claim 1, wherein the electrowetting operation to merge the sample droplet and the collection droplet minimizes bulk disturbance and convective mixing of the sample droplet and the collection droplet.

3. The method of claim 1, wherein performing an electrowetting operation to bring the sample droplet into contact with the collection droplet comprises forming a droplet interface bilayer (DIB) comprising a lipid bilayer formed at an interface of the sample droplet and the collection droplet, and the separation process comprises selective movement of either the first particles or the second particles across the DIB.

4. The method of claim 1, wherein the separation process includes applying a gradient within the collection droplet or between the sample droplet and the collection droplet.

5. The method of claim 4, wherein the gradient is a voltage gradient formed by electrodes located within the EWOD device.

6. The method of claim 1, wherein the separation process includes electrophoresis and/or dielectrophoresis.

7. The method of claim 1, further comprising performing an electrowetting operation to transfer the leaving droplet to another location on the EWOD device for downstream processing.

8. The method of claim 1, wherein the time interval is in a range of five seconds to ten hours.

9. The method of claim 1, wherein inputting the sample droplet comprises performing an electrowetting operation to prepare the sample droplet from source droplets within the EWOD device.

10. The method of claim 9, wherein preparing the sample droplet comprises mixing a source sample with an agent within the EWOD device, and the agent digests the source sample into the first and second particles.

11. The method of claim 10, wherein preparing the sample droplet comprises protease digestion of protein, peptidase digestion of peptide, or nuclease digestion of nucleic acid.

12. The method of claim 1, wherein the first and/or second particles comprise a protein or a nucleic acid.

13. The method of claim 1, wherein the sample droplet includes a fluorescent dye, and the method further comprises measuring a fluorescence intensity of the leaving droplet.

14. The method of claim 1, wherein the leaving droplet is utilized as the sample droplet in a subsequent separation process, wherein the subsequent separation process comprises:

inputting a second collection droplet into the EWOD device;

performing an electrowetting operation to bring the leaving droplet into contact with the second collection droplet;

at another initial time, initiating a process of particle separation by which a portion of the leaving droplet is introduced into the second collection droplet, wherein the first particles move through the second collection droplet at a rate different from the second particles; and after another time interval from the another initial time, performing an electrowetting operation to segment a second leaving droplet from the second collection droplet, wherein the second leaving droplet has a higher concentration of the first particles relative to the second particles as compared to a concentration of the first particles relative to the second particles in the leaving droplet at the another initial time;

wherein performing an electrowetting operation to bring the leaving droplet into contact with the second collection droplet comprises merging the leaving droplet and the second collection droplet, and the separation process comprises passive diffusion of the first and second particles of the leaving droplet into the second collection droplet; and wherein the first and second particles passively diffuse in the second collection droplet at different diffusion rates until there is separation of the first and second particles to form the second leaving droplet having the higher concentration of the first particles relative to the second particles as compared to the leaving droplet.

15. The method of claim 14, wherein the separation process is sequentially repeated, and each subsequently separated leaving droplet becomes the sample droplet for a next subsequent separation process.

16. The method of claim 1, wherein the collection droplet is an elongated droplet relative to the sample droplet.

17. A microfluidic system comprising:

an electro-wetting on dielectric (EWOD) device comprising an element array configured to receive liquid droplets, the element array comprising a plurality of individual array elements;

wherein liquid droplets include a sample droplet comprising a mixture of particles including first particles and second particles that are different from each other, and a collection droplet; and a control system configured to perform electrowetting operations by controlling actuation voltages applied to the element array to perform manipulation operations as to liquid droplets present on the element array;

wherein the control system is configured to perform the steps of:

performing an electrowetting operation to bring the sample droplet into contact with the collection droplet;

at an initial time, initiating a process of particle separation by which a portion of the sample droplet is introduced into the collection droplet, wherein the first particles particles move through the collection droplet at a rate different from the second particles; and after a time interval from the initial time, performing an electrowetting operation to segment a leaving droplet from the collection droplet, wherein the leaving droplet has a higher concentration of the first particles relative to the second particles as compared to a concentration of the first particles relative to the second particles in the sample droplet at the initial time;

wherein performing an electrowetting operation to bring the sample droplet into contact with the collection droplet comprises merging the sample droplet and the collection droplet, and the separation process comprises passive diffusion of the first and second particles of the sample droplet into the collection droplet;

wherein the first particles have a different hydrodynamic radius from the second particles such that the first and second particles passively diffuse in the collection droplet at different diffusion rates until there is separation of the first and second particles to form the leaving droplet having the higher concentration of the first particles relative to the second particles.

18. The microfluidic system of claim 17, wherein the EWOD device further comprises an electrode arrangement, and the separation process includes forming a voltage gradient with the electrode arrangement within the collection droplet or between the sample droplet and the collection droplet.

19. The microfluidic system of claim 17, wherein the control system is configured to merge the sample droplet and the collection droplet in a manner that minimizes bulk disturbance and convective mixing of the sample droplet and the collection droplet.

20. A non-transitory computer-readable medium storing program code which is executed by a processing device for controlling actuation voltages applied to array elements of an element array of an electro-wetting on dielectric (EWOD) device comprising an element array configured to receive liquid droplets, the element array comprising a plurality of individual array elements and wherein the liquid droplets include a sample droplet comprising a mixture of particles including first particles and second particles that are different from each other, and a collection droplet;

the program code being executable by the processing device to perform the steps of:

performing an electrowetting operation to bring the sample droplet into contact with the collection droplet;

at an initial time, initiating a process of particle separation by which a portion of the sample droplet is introduced into the collection droplet, wherein the first particles move through the collection droplet at a rate different from the second particles; and after a time interval from the initial time, performing an electrowetting operation to segment a leaving droplet from the collection droplet, wherein the leaving droplet has a higher concentration of the first particles relative to the second particles as compared to a concentration of the first particles relative to the second particles in the sample droplet at the initial time;

wherein performing an electrowetting operation to bring the sample droplet into contact with the collection droplet comprises merging the sample droplet and the collection droplet, and the separation process comprises passive diffusion of the first and second particles of the sample droplet into the collection droplet;

wherein the first particles have a different hydrodynamic radius from the second particles such that the first and second particles passively diffuse in the collection droplet at different diffusion rates until there is separation of the first and second particles to form the leaving droplet having the higher concentration of the first particles relative to the second particles.

* * * * *